United States Patent
Imai et al.

(10) Patent No.: US 12,546,924 B2
(45) Date of Patent: Feb. 10, 2026

(54) OPTICAL FILTER AND IMAGING APPARATUS

(71) Applicant: HOYA CORPORATION, Tokyo (JP)

(72) Inventors: Haruna Imai, Toda (JP); Shinichi Ogawa, Toda (JP); Takeshi Yamazaki, Toda (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 16/430,686

(22) Filed: Jun. 4, 2019

(65) Prior Publication Data
US 2019/0369312 A1    Dec. 5, 2019

(30) Foreign Application Priority Data

Jun. 4, 2018  (JP) ................................. 2018-107112
May 29, 2019  (JP) ................................. 2019-100284

(51) Int. Cl.
| | |
|---|---|
| *C09D 183/06* | (2006.01) |
| *C03C 3/16* | (2006.01) |
| *C03C 3/247* | (2006.01) |
| *C03C 17/30* | (2006.01) |
| *C03C 17/34* | (2006.01) |
| *G02B 5/22* | (2006.01) |

(52) U.S. Cl.
CPC ................ *G02B 5/226* (2013.01); *C03C 3/16* (2013.01); *C03C 3/247* (2013.01); *C03C 17/30* (2013.01); *C03C 17/3405* (2013.01); *C09D 183/06* (2013.01); *C03C 2218/11* (2013.01)

(58) Field of Classification Search
None
See application file for complete search history.

(56) References Cited

U.S. PATENT DOCUMENTS

| 4,596,745 A | * | 6/1986 | Chao ..................... | H01J 29/896 |
|---|---|---|---|---|
| | | | | 428/428 |
| 2002/0123592 A1 | * | 9/2002 | Zhang ................... | C08G 77/04 |
| | | | | 528/10 |
| 2004/0082460 A1 | * | 4/2004 | Yamane ................. | G02B 5/226 |
| | | | | 501/48 |
| 2004/0212060 A1 | * | 10/2004 | Hachitani ............. | H10F 39/806 |
| | | | | 257/678 |
| 2008/0268260 A1 | * | 10/2008 | Varaprasad ........... | C03C 17/256 |
| | | | | 427/160 |
| 2014/0247480 A1 | * | 9/2014 | Tatemura ............... | G02B 5/282 |
| | | | | 359/359 |
| 2015/0146057 A1 | | 5/2015 | Konishi et al. | |
| 2018/0067243 A1 | * | 3/2018 | Shiono .................. | C09B 57/007 |

FOREIGN PATENT DOCUMENTS

| JP | 2014052431 A | | 3/2014 |
|---|---|---|---|
| JP | 2014148567 A | | 8/2014 |
| KR | 920004191 B1 | * | 5/1992 |
| KR | 1020150046016 A | | 4/2015 |

OTHER PUBLICATIONS

Seco article Materials Science and Engineering B76 193-199 (2000).*
KR920004191B1 English machine translation (1992).*
OELD choose (2023).*

* cited by examiner

*Primary Examiner* — Sheeba Ahmed
(74) *Attorney, Agent, or Firm* — Greenblum & Bernstein, P.L.C.

(57) ABSTRACT

Provided is an optical filter, including an absorbing glass substrate composed of phosphate-based glass or fluorophosphate-based glass; a bonding layer with a single layer structure; and a resin layer, wherein the resin layer is provided on the absorbing glass substrate through the bonding layer, wherein the bonding layer includes a Si atom and one or more selected from a Ti atom, a Zr atom, and an Al atom; or an optical filter, including an absorbing glass substrate composed of phosphate-based glass or fluorophosphate-based glass; and a resin layer, wherein the resin layer includes a Si atom and one or more selected from a Ti atom, a Zr atom, and an Al atom, and is provided on the absorbing glass substrate.

12 Claims, 4 Drawing Sheets

OPTICAL FILTER AND IMAGING APPARATUS

CROSS-REFERENCE TO RELATED APPLICATION

This application claims the priority benefit of Japanese Patent Application No. 2018-107112 filled on Jun. 4, 2018 and No. 2019-100284 filled on May 29, 2019, the disclosure of which is incorporated herein by reference.

BACKGROUND OF THE DISCLOSURE

Field of the Disclosure

The present disclosure relates to an optical filter and an imaging apparatus.

Background of the Disclosure

FIELD OF THE DISCLOSURE

In imaging apparatuses adopting a solid-state image device, such as a CCD or CMOS image sensor, mounted in Digital Still Cameras (DSCs) such as a compact digital camera and a digital SLR camera, an InfraRed Cut-off Filter (IRCF) serving to transmit visible light and blocking ultraviolet light and near infrared light to reproduce good colors and clear images has been used (for example, see Patent Document 1 (Japanese Unexamined Patent Application Publication No. 2014-148567)).

FIG. 1A and FIG. 1B illustrate schematic views of camera modules as constituents of a DSC, FIG. 1A illustrates a schematic view of a camera module of a compact digital camera mounted in a smartphone, etc., and FIG. 1B illustrates a schematic view of a camera module of a digital SLR camera.

With regard to the camera module shown in FIG. 1A, an IRCF 1 selectively reflects ultraviolet light and near infrared light among light transmitted through a lens L so that only light in a visible light region matching the human visibility characteristics is selectively introduced into a module and received by an image sensor IC. Also in the case of the camera module shown in FIG. 1B, an IRCF 1 selectively reflects ultraviolet light and near infrared light among light transmitted through a lens L, and then a cover glass CG serves to prevent penetration of dust while removing α-rays so that only light in a visible light region matching the human visibility characteristics is selectively introduced into a module and accepted into an image sensor IC.

The IRCFs have generally been manufactured by providing a reflective film (UVIR film) on an upper surface side (light-incident surface side) of a glass substrate or providing an antireflection film (AR film) on a lower surface side (light-emitting surface side) of a glass substrate.

FIG. 2A illustrates schematic views of structures of conventional IRCFs 1. An IRCF 1 shown in FIG. 2A is manufactured by providing a reflective film (UVIR film) 2 on an upper surface side (light-incident surface side) of a glass substrate 3 and providing an antireflection film (AR film) 4 on a lower surface side (light-emitting surface side) of the glass substrate 3 so that the reflective film 2 selectively reflects ultraviolet light and near infrared among light incident from above and only light in a visible light region matching the human visibility characteristics passes through the glass substrate 3 and the AR film 4 and is emitted from the bottom of the AR film 4.

However, various components of a digital still camera have been minimized and thinned according to the demand for thinning thereof, thereby being optically designed such that oblique light can be incident on an image sensor. Meanwhile, since the reflection-type IRCF greatly depends upon the wavelength of light, a phase shift wherein a cutoff frequency is shifted to a short wavelength side occurs when the angle of incidence of light increases. Accordingly, in the case of light passing through the center of a lens and light passing through a peripheral portion thereof, angles of incidence of light incident on an IRCF are different from each other, whereby a decrease in color reproducibility may easily occur due to an interference shift.

To address such a problem, a reflective film (UVIR film) and an absorbing resin layer are separately provided as IRCFs, or a light-absorbing substrate (absorbing glass substrate) is combined as a glass substrate, thereby reducing a load of a reflective film (UVIR film). In addition, a hybrid-type IRCF capable of exhibiting excellent incidence characteristics while more efficiently reducing ultraviolet light and near infrared light among incident light has been considered.

FIG. 2B is a schematic view illustrating an exemplary structure of the hybrid-type IRCF 1. In the case of the IRCF 1 shown in FIG. 2B, a reflective film (UVIR film) 2 is provided on an upper surface side (light-incident surface side) of an absorbing glass substrate 3' absorbing at least one of ultraviolet light and near infrared light, and an absorbing resin layer 5 and antireflection film (AR film) 4 absorbing ultraviolet light or near infrared light are sequentially provided on a lower surface side (light-emitting surface side) of the absorbing glass substrate 3'. Accordingly, since the reflective film (UVIR film) 2, the absorbing glass substrate 3' and the absorbing resin layer 5 are used together, only light in a visible light region can be transmitted and emitted in a bottom direction despite high-oblique incidence characteristics while more efficiently reducing ultraviolet light and near infrared light among incident light.

RELATED ART DOCUMENT

Patent Document

Japanese Unexamined Patent Application Publication No. 2014-148567

SUMMARY OF THE DISCLOSURE

Generally, phosphate-based glass such as phosphate glass or fluorophosphate glass is generally used as a component of an absorbing glass substrate for absorbing ultraviolet light or near infrared light. Meanwhile, an organic material composed of various polymers is used as a material for constituting an absorbing resin layer. However, the present inventors have found that adhesion between the phosphate-based glass and the organic material is not sufficient, particularly that adhesion therebetween is likely to become insufficient in the copresence of water.

Therefore, the present disclosure has been made in view of the above problems, and it is one object of the present disclosure to provide an optical filter provided with a resin layer having high adhesion to an absorbing glass substrate composed of phosphate-based glass or fluorophosphate-based glass and an imaging apparatus including the optical filter.

The present inventors have studied extensively to address the above problem and have found that the problem can be addressed by the provision of an optical filter, including an absorbing glass substrate composed of phosphate-based glass or fluorophosphate-based glass; a bonding layer with a single layer structure; and a resin layer, wherein the resin layer is provided on the absorbing glass substrate through the bonding layer, wherein the bonding layer includes a Si atom and one or more selected from a Ti atom, a Zr atom, and an Al atom, thus completing the present disclosure based on this finding.

That is, the present disclosure provides:

(1) an optical filter (hereinafter referred to as "the optical filter 1 of the present disclosure" as needed), including an absorbing glass substrate composed of phosphate-based glass or fluorophosphate-based glass; a bonding layer with a single layer structure; and a resin layer, wherein the resin layer is provided on the absorbing glass substrate through the bonding layer, wherein the bonding layer includes a Si atom and one or more selected from a Ti atom, a Zr atom, and an Al atom, (2) the optical filter of (1), wherein, in the bonding layer, a ratio of a total atomic number of a Ti atom, a Zr atom, and an Al atom to a total number of a Si atom, a Ti atom, a Zr atom, and an Al atom is greater than 0 atomic % and 33.3 atomic % or less, (3) the optical filter of (1) or (2) (hereinafter referred to as "the optical filter 1-1 of the present disclosure" as needed), wherein the resin layer is provided on the absorbing glass substrate composed of phosphate-based glass or fluorophosphate-based glass through a bonding layer interposed between the resin layer and the absorbing glass substrate, wherein the bonding layer includes hydrolyzed and dehydrated condensates of one or more coupling agents selected from compounds represented by Formulas (I) and (II) below:

$$M(OSiR^1R^2R^3)_n \qquad (I)$$

wherein M is a Ti atom, a Zr atom, or an Al atom, $R^1$, $R^2$ and $R^3$ are straight- or branched-chain hydrocarbon groups having 1 to 10 carbon atoms, which include or exclude an oxygen atom or a nitrogen atom, and are equal to or different from each other, n is 4 when M is a Ti atom or a Zr atom, or 3 when M is an Al atom, a plurality of —$OSiR^1R^2R^3$ groups are equal to or different from each other, and $$(Ti_kO_{k-1})(OSiR^4R^5R^6)_{2k+2} \qquad (II)$$

wherein $R^4$, $R^5$ and $R^6$ are straight- or branched-chain hydrocarbon groups having 1 to 10 carbon atoms, which include or exclude an oxygen atom or a nitrogen atom, and are equal to or different from each other, k is a real number between 2 and 15, and a plurality of —$OSiR^4R^5R^6$ groups are equal to or different from each other, (4) the optical filter of any one of (1) to (3) (hereinafter referred to as "the optical filter 1-2 of the present disclosure" as needed), wherein the resin layer is provided on the absorbing glass substrate composed of phosphate-based glass or fluorophosphate-based glass through a bonding layer interposed between the resin layer and the absorbing glass substrate, wherein the bonding layer includes hydrolyzed and dehydrated condensates of one or more coupling agents selected from compounds represented by Formulas (III) and (IV) below:

$$M\{OSi(OR^7)(OR^8)(OR^9)\}_n \qquad (III)$$

wherein M is a Ti atom, a Zr atom, or an Al atom, $R^7$, $R^8$ and $R^9$ are straight- or branched-chain hydrocarbon groups having 1 to 10 carbon atoms and are equal to or different from each other, n is 4 when M is a Ti atom or a Zr atom, or 3 when M is an Al atom, and a plurality of —$OSi(OR^7)(OR^8)(OR^9)$ groups are equal to or different from each other, and $$(Ti_kO_{k-1})\{OSi(OR^{10})(OR^{11})(OR^{12})\}_{2k+2} \qquad (IV)$$

wherein $R^{10}$, $R^{11}$ and $R^{12}$ are straight- or branched-chain hydrocarbon groups having 1 to 10 carbon atoms and are equal to or different from each other, k is a real number between 2 and 15, a plurality of —$OSi(OR^{10})(OR^{11})(OR^{12})$ groups are equal to or different from each other, (5) the optical filter of (4), wherein the coupling agent represented by Formula (III) is a reaction product between a silicon compound represented by Formula (V) below and one or more selected from metal alkoxides represented by Formulas (VI), (VII), and (VIII) below:

$$Si(OR^7)(OR^8)(OR^9)OH \qquad (V)$$

wherein $R^7$, $R^8$ and $R^9$ are straight- or branched-chain hydrocarbon groups having 1 to 10 carbon atoms and are equal to or different from each other, $$Ti(OR^{13})(OR^{14})(OR^{15})(OR^{16}) \qquad (VI)$$

wherein $R^{13}$, $R^{14}$, $R^{15}$ and $R^{16}$ are straight- or branched-chain hydrocarbon groups having 1 to 10 carbon atoms and are equal to or different from each other, $$Zr(OR^{17})(OR^{18})(OR^{19})(OR^{20}) \qquad (VII)$$

wherein $R^{17}$, $R^{18}$, $R^{19}$ and $R^{20}$ are straight- or branched-chain hydrocarbon groups having 1 to 10 carbon atoms and are equal to or different from each other, and $$Al(OR^{21})(OR^{22})(OR^{23}) \qquad (VIII)$$

wherein $R^{21}$, $R^{22}$ and $R^{23}$ are straight- or branched-chain hydrocarbon groups having 1 to 10 carbon atoms and are equal to or different from each other, (6) the optical filter of any one of (1) to (5), wherein the bonding layer further includes a dehydrated condensate of silanol, (7) the optical filter of any one of (1) to (6), wherein the resin layer is provided on the absorbing glass substrate composed of phosphate-based glass or fluorophosphate-based glass through a bonding layer interposed between the resin layer and the absorbing glass substrate, wherein the bonding layer includes a hydrolyzed and dehydrated condensate of a coupling agent composition including a reaction product between 50 mol % or more and less than 100 mol % of a silicon compound represented by Formula (V) below and greater than 0 mol % and 50 mol % or less of one or more selected from metal alkoxides represented by Formulas (VI), (VII), and (VIII) below:

$$Si(OR^7)(OR^8)(OR^9)OH \qquad (V)$$

wherein $R^7$, $R^8$ and $R^9$ are straight- or branched-chain hydrocarbon groups having 1 to 10 carbon atoms and are equal to or different from each other, $$Ti(OR^{13})(OR^{14})(OR^{15})(OR^{16}) \qquad (VI)$$

wherein $R^{13}$, $R^{14}$, $R^{15}$ and $R^{16}$ are straight- or branched-chain hydrocarbon groups having 1 to 10 carbon atoms and are equal to or different from each other, $$Zr(OR^{17})(OR^{18})(OR^{19})(OR^{20}) \qquad (VII)$$

wherein $R^{17}$, $R^{18}$, $R^{19}$ and $R^{20}$ are straight- or branched-chain hydrocarbon groups having 1 to 10 carbon atoms and are equal to or different from each other, and $$Al(OR^{21})(OR^{22})(OR^{23}) \quad (VIII)$$

wherein $R^{21}$, $R^{22}$ and $R^{23}$ are straight- or branched-chain hydrocarbon groups having 1 to 10 carbon atoms and are equal to or different from each other, (8) the optical filter of (7), wherein the coupling agent composition is a reaction product between greater than 80 mol % and less than 100 mol % of the silicon compound represented by Formula (V) and greater than 0 mol % and less than 20 mol % of one or more metal alkoxides selected from Formulas (VI), (VII), and (VIII), (9) the optical filter of (7), wherein the coupling agent composition is a reaction product between 85 to 94 mol % of the silicon compound represented by Formula (V) and 6 to 15 mol % of one or more metal alkoxides selected from Formulas (VI), (VII), and (VIII),

(10) an optical filter (hereinafter referred to as "optical filter 2" as needed), including an absorbing glass substrate composed of phosphate-based glass or fluorophosphate-based glass; and a resin layer, wherein the resin layer includes a Si atom and one or more selected from a Ti atom, a Zr atom, and an Al atom, and is provided on the absorbing glass substrate,

(11) the optical filter of (10), wherein, in the resin layer, a ratio of a total atomic number of a Ti atom, a Zr atom, and an Al atom to a total number of a Si atom, a Ti atom, a Zr atom, and an Al atom is greater than 0 atomic % and 33.3 atomic % or less,

(12) the optical filter (hereinafter referred as "optical filter 2-1" as needed) of (10) or (11), wherein a resin layer including hydrolyzed and dehydrated condensates of one or more coupling agents selected from compounds represented by Formulas (I) and (II) below is provided on the absorbing glass substrate composed of phosphate-based glass or fluorophosphate-based glass:

$$M(OSiR^1R^2R^3)_n \quad (I)$$

wherein M is a Ti atom, a Zr atom, or an Al atom, $R^1$, $R^2$ and $R^3$ are straight- or branched-chain hydrocarbon groups having 1 to 10 carbon atoms, which include or exclude an oxygen atom or a nitrogen atom, and are equal to or different from each other, n is 4 when M is a Ti atom or a Zr atom, or 3 when M is an Al atom, a plurality of —$OSiR^1R^2R^3$ groups are equal to or different from each other, and $$(Ti_kO_{k-1})(OSiR^4R^5R^6)_{2k+2} \quad (II)$$

wherein $R^4$, $R^5$ and $R^6$ are straight- or branched-chain hydrocarbon groups having 1 to 10 carbon atoms, which include or exclude an oxygen atom or a nitrogen atom, and are equal to or different from each other, k is a real number between 2 and 15, and a plurality of —$OSiR^4R^5R^6$ groups are equal to or different from each other,

(13) the optical filter (hereinafter referred to as "optical filter 2-2" as needed) of any one of (10) to (12), wherein a resin layer including hydrolyzed and dehydrated condensates of one or more coupling agents selected from compounds represented by Formulas (III) and (IV) below is provided on the absorbing glass substrate composed of phosphate-based glass or fluorophosphate-based glass:

$$M\{OSi(OR^7)(OR^8)(OR^9)\}_n \quad (III)$$

wherein M is a Ti atom, a Zr atom, or an Al atom, $R^7$, $R^8$ and $R^9$ are straight- or branched-chain hydrocarbon groups having 1 to 10 carbon atoms and are equal to or different from each other, n is 4 when M is a Ti atom or a Zr atom, or 3 when M is an Al atom, and a plurality of —$OSi(OR^7)(OR^8)(OR^9)$ groups are equal to or different from each other, and $$(Ti_kO_{k-1})\{OSi(OR^{10})(OR^{11})(OR^{12})\}_{2k+2} \quad (IV)$$

wherein $R^{10}$, $R^{11}$ and $R^{12}$ are straight- or branched-chain hydrocarbon groups having 1 to 10 carbon atoms and are equal to or different from each other, k is a real number between 2 and 15, a plurality of —$OSi(OR^{10})(OR^{11})(OR^{12})$ groups are equal to or different from each other,

(14) the optical filter of (13), wherein the coupling agent represented by Formula (III) is a reaction product between a silicon compound represented by Formula (V) below and one or more selected from metal alkoxides represented by Formulas (VI), (VII), and (VIII) below:

$$Si(OR^7)(OR^8)(OR^9)OH \quad (V)$$

wherein $R^7$, $R^8$ and $R^9$ are straight- or branched-chain hydrocarbon groups having 1 to 10 carbon atoms and are equal to or different from each other, $$Ti(OR^{13})(OR^{14})(OR^{15})(OR^{16}) \quad (VI)$$

wherein $R^{13}$, $R^{14}$, $R^{15}$ and $R^{16}$ are straight- or branched-chain hydrocarbon groups having 1 to 10 carbon atoms and are equal to or different from each other, $$Zr(OR^{17})(OR^{18})(OR^{19})(OR^{20}) \quad (VII)$$

wherein $R^{17}$, $R^{18}$, $R^{19}$ and $R^{20}$ are straight- or branched-chain hydrocarbon groups having 1 to 10 carbon atoms and are equal to or different from each other, and $$Al(OR^{21})(OR^{22})(OR^{23}) \quad (VIII)$$

wherein $R^{21}$, $R^{22}$ and $R^{23}$ are straight- or branched-chain hydrocarbon groups having 1 to 10 carbon atoms and are equal to or different from each other,

(15) the optical filter of any one of (10) to (14), wherein the resin layer further includes a dehydrated condensate of silanol,

(16) the optical filter of any one of (10) to (15), wherein the resin layer including a hydrolyzed and dehydrated condensate of a coupling agent composition that includes a reaction product between 50 mol % or more and less than 100 mol % of a silicon compound represented by Formula (V) below and greater than 0 mol % and 50 mol % or less of one or more selected from metal alkoxides represented by Formulas (VI), (VII), and (VIII) below is provided on the absorbing glass substrate composed of phosphate-based glass or fluorophosphate-based glass:

$$Si(OR^7)(OR^8)(OR^9)OH \quad (V)$$

wherein $R^7$, $R^8$ and $R^9$ are straight- or branched-chain hydrocarbon groups having 1 to 10 carbon atoms and are equal to or different from each other, $$Ti(OR^{13})(OR^{14})(OR^{15})(OR^{16}) \quad (VI)$$

wherein $R^{13}$, $R^{14}$, $R^{15}$ and $R^{16}$ are straight- or branched-chain hydrocarbon groups having 1 to 10 carbon atoms and are equal to or different from each other, $$Zr(OR^{17})(OR^{18})(OR^{19})(OR^{20}) \quad (VII)$$

wherein $R^{17}$, $R^{18}$, $R^{19}$ and $R^{20}$ are straight- or branched-chain hydrocarbon groups having 1 to 10 carbon atoms and are equal to or different from each other, and $$\text{Al}(OR^{21})(OR^{22})(OR^{23}) \quad \text{(VIII)}$$

wherein $R^{21}$, $R^{22}$ and $R^{23}$ are straight- or branched-chain hydrocarbon groups having 1 to 10 carbon atoms and are equal to or different from each other,
(17) the optical filter of (16), wherein the coupling agent composition is a reaction product between greater than 80 mol % and less than 100 mol % of the silicon compound represented by Formula (V) and greater than 0 mol % and less than 20 mol % of one or more metal alkoxides selected from Formulas (VI), (VII), and (VIII),
(18) the optical filter of (16), wherein the coupling agent composition is a reaction product between 85 to 94 mol % of the silicon compound represented by Formula (V) and 6 to 15 mol % of one or more metal alkoxides selected from Formulas (VI), (VII), and (VIII), and
(19) an imaging apparatus, including a solid-state image device; an image lens; and the optical filter of any one of (1) to (18).

The present disclosure can provide an optical filter comprising an absorbing glass substrate composed of phosphate-based glass or fluorophosphates glass having a resin layer provided thereon with high adhesion, and an imaging apparatus having the optical filter.

BRIEF DESCRIPTION OF THE DRAWINGS

The above and other objects, features and other advantages of the present disclosure will be more clearly understood from the following detailed description taken in conjunction with the accompanying drawings, in which:

FIG. 1A illustrates a schematic view of a camera module of a compact digital camera, and FIG. 1B illustrates a schematic view of a camera module of a digital SLR camera;

FIG. 2A illustrates a schematic view of a reflection-type IRCF, a reflective film (UVIR film) of which reflects ultraviolet light and near infrared light, and FIG. 2B illustrates a schematic view of a hybrid-type IRCF including a reflective film (UVIR film) and an absorbing glass substrate and absorbing resin layer for absorbing ultraviolet light or near infrared light;

DETAILED DESCRIPTION OF THE DISCLOSURE

Figure 1A:
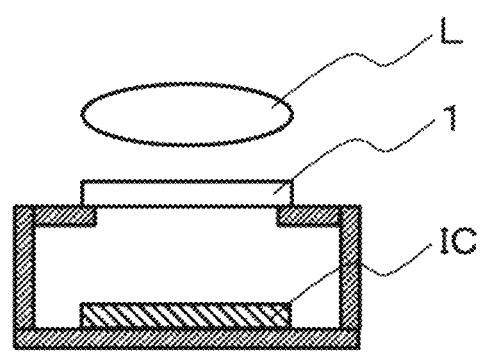
FIG. 1A and FIG. 1B illustrate schematic views of camera modules.

An optical filter 1 of the present disclosure includes an absorbing glass substrate composed of phosphate-based glass or fluorophosphate-based glass; a bonding layer with a single layer structure; and a resin layer, wherein the resin layer is provided on the absorbing glass substrate through the bonding layer, wherein the bonding layer includes a Si atom and one or more selected from a Ti atom, a Zr atom, and an Al atom. As a particular embodiment, an optical filter 1-1 or 1-2 according to the present disclosure is described below.

An optical filter 2 of the present disclosure includes an absorbing glass substrate composed of phosphate-based glass or fluorophosphate-based glass; and a resin layer, wherein the resin layer includes a Si atom and one or more selected from a Ti atom, a Zr atom, and an Al atom, and is provided on the absorbing glass substrate. As a particular embodiment, an optical filter 2-1 or 2-2 according to the present disclosure is described below.

The optical filter 1 of the present disclosure differs from the optical filter 2 of the present disclosure in that the optical filter 1 is provided with a bonding layer with a single layer structure, which includes a Si atom and one or more selected from a Ti atom, a Zr atom, and an Al atom, interposed between a resin layer and an absorbing glass substrate, whereas the optical filter 2 is provided with a resin layer including a Si atom and one or more selected from a Ti atom, a Zr atom, and an Al atom, and other components are the same.

Hereinafter, the description of the optical filter 1 of the present disclosure is the same as that of the optical filter 2 of the present disclosure unless specified otherwise.

[Glass Substrate]

An optical filter according to the present disclosure includes an absorbing glass substrate composed of phosphate-based glass or fluorophosphate-based glass, as a glass substrate.

With regard to the optical filter according to the present disclosure, the thickness of the absorbing glass substrate is preferably 0.01 to 1.50 mm, more preferably 0.01 to 0.70 mm, even more preferably 0.01 to 0.30 mm.

When the thickness of the absorbing glass substrate is within these ranges, the optical filter may be easily thinned.

In the optical filter according to the present disclosure, the absorbing glass substrate is composed of phosphate-based glass or fluorophosphate-based glass.

The phosphate-based glass of the present disclosure may include P and O, as essential elements, and any other elements. Particularly preferably, the phosphate-based glass includes CuO. When the phosphate-based glass includes CuO, near infrared light may be more efficiently observed. Examples of other elements of the phosphate-based glass include Ca, Mg, Sr, Ba, Li, Na, K, Cs, and the like.

The fluorophosphate-based glass of the present disclosure may include P, O, and F as essential elements, and any other elements. Particularly preferably, the fluorophosphate-based glass includes CuO. When the fluorophosphate-based glass includes CuO, near infrared light may be more efficiently observed. Examples of other elements of the fluorophosphate-based glass include Ca, Mg, Sr, Ba, Li, Na, K, Cs, and the like.

The phosphate-based glass preferably includes:

| | |
|---|---|
| $P_2O_5$ | greater than 0% by mass and 70% by mass or less, |
| $Al_2O_3$ | 0 to 40% by mass, |
| BaO | 0 to 40% by mass, and |
| CuO | 0 to 40% by mass. |

The phosphate-based glass more preferably includes:

| | |
|---|---|
| $P_2O_5$ | 20 to 60% by mass, |
| $Al_2O_3$ | 0 to 10% by mass, |

| | |
|---|---|
| BaO | 0 to 10% by mass, and |
| CuO | 0 to 10% by mass. |

The phosphate-based glass even more preferably includes:

| | |
|---|---|
| $P_2O_5$ | 20 to 60% by mass, |
| $Al_2O_3$ | 1 to 10% by mass, |
| BaO | 1 to 10% by mass, and |
| CuO | 1 to 10% by mass. |

The fluorophosphate-based glass preferably includes:

| | |
|---|---|
| $P_2O_5$ | greater than 0% by mass and 70% by mass or less, |
| $Al_2O_3$ | 0 to 40% by mass, |
| BaO | 0 to 40% by mass, and |
| CuO | 0 to 40% by mass, and additionally greater than 0% by mass and 40% by mass or less of a fluoride. |

The fluorophosphate-based glass more preferably includes:

| | |
|---|---|
| $P_2O_5$ | 20 to 60% by mass, |
| $Al_2O_3$ | 0 to 10% by mass, |
| BaO | 0 to 10% by mass, and |
| CuO | 0 to 10% by mass, and additionally 1 to 30% by mass of a fluoride. |

The fluorophosphate-based glass even more preferably includes:

| | |
|---|---|
| $P_2O_5$ | 20 to 60% by mass, |
| $Al_2O_3$ | 1 to 10% by mass, |
| BaO | 1 to 10% by mass, and |
| CuO | 1 to 10% by mass, and additionally 2 to 30% by mass of a fluoride. |

The fluoride may be one or more selected from $MgF_2$, $CaF_2$, $SrF_2$, and the like.

The optical filter 1 of the present disclosure is characterized in that a bonding layer with a single layer structure including a Si atom and one or more selected from a Ti atom, a Zr atom, and an Al atom is interposed between a glass substrate and a resin layer.

In the optical filter 1 of the present disclosure, the bonding layer may include a hydrolyzed and dehydrated condensate of a coupling agent described below.

In the optical filter 1 of the present disclosure, the bonding layer has a single layer structure including a Si atom and one or more selected from a Ti atom, a Zr atom, and an Al atom.

In the present specification, the single layer structure refers to a layer structure constituted of a material having the same composition based on image contrasts or element analysis results obtained by means of a scanning transmission electron microscope-energy dispersive X-ray spectrometer (STEM-EDX) under the following conditions.

<Measurement Conditions>
Scanning transmission electron microscope: ARM200F manufactured by JEOL Ltd.
Energy dispersive X-ray spectrometer: JED-2300T manufactured by JEOL Ltd.
Sample preparation: Focused ion beam (FIB) machining
Acceleration voltage: 200 kV
Element analysis: EDX mapping (resolution: 256×256)

Figure 3:
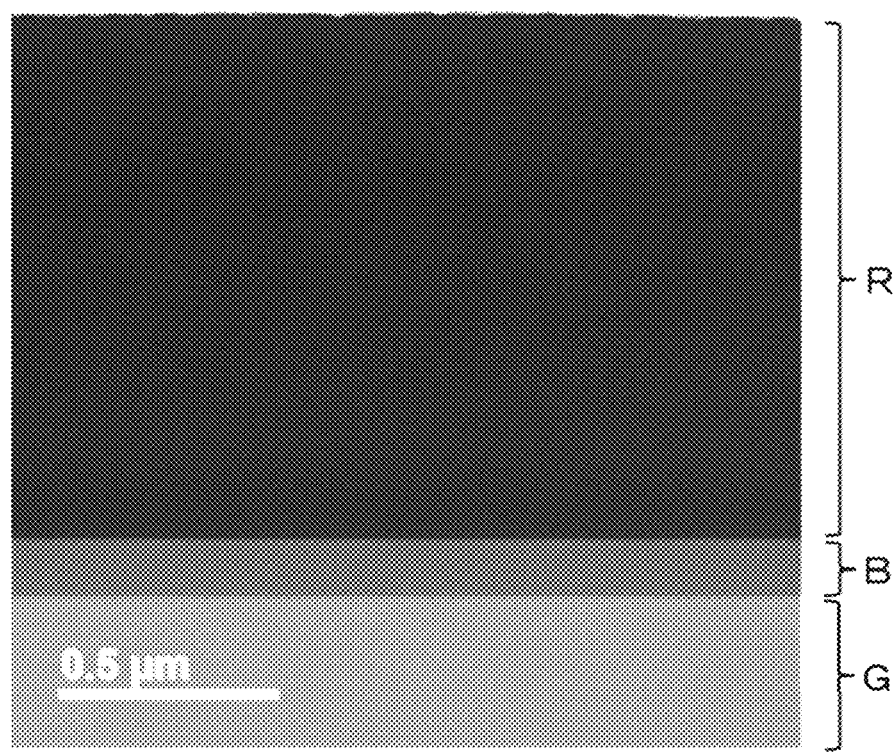
FIG. 3 illustrates a cross-sectional image (image contrast) obtained by a scanning transmission electron microscope-energy dispersive X-ray spectrometer (STEM-EDX) using an embodiment of an optical filter of the present disclosure.

FIG. 3 illustrates a STEM-EDX image contrast of an embodiment of the optical filter according to the present disclosure obtained under the aforementioned measurement conditions. From the figure, it can be confirmed that the optical filter includes a resin layer R formed on an absorbing glass substrate G through a bonding layer B interposed between the resin layer R and the absorbing glass substrate G, and the bonding layer B has a single layer structure.

In the optical filter 1 of the present disclosure, the thickness of the bonding layer is preferably 1000 nm or less, more preferably 10 to 500 nm, even more preferably 30 to 300 nm.

When the thickness of the bonding layer is 1000 nm or less, generation of a non-uniform film upon formation (sintering) of the bonding layer may be easily prevented, whereby a surface of the bonding layer may be easily uniformed.

When the thickness of the bonding layer is 10 nm or more, the bonding layer may easily exhibit sufficient bonding strength, whereby the mechanical strength of an optical filter may be easily increased.

In the present specification, the thickness of a bonding layer refers to an arithmetic mean of values measured at 50 portions of the bonding layer using a sectional image contrast of an optical filter obtained by means of STEM-EDX.

In the optical filter 1 of the present disclosure, the bonding layer includes a Si atom and one or more selected from a Ti atom, a Zr atom, and an Al atom. One or more selected from a Ti atom, a Zr atom, and an Al atom, which are contained along with a Si atom in the bonding layer, is preferably a Ti atom.

Figure 4:
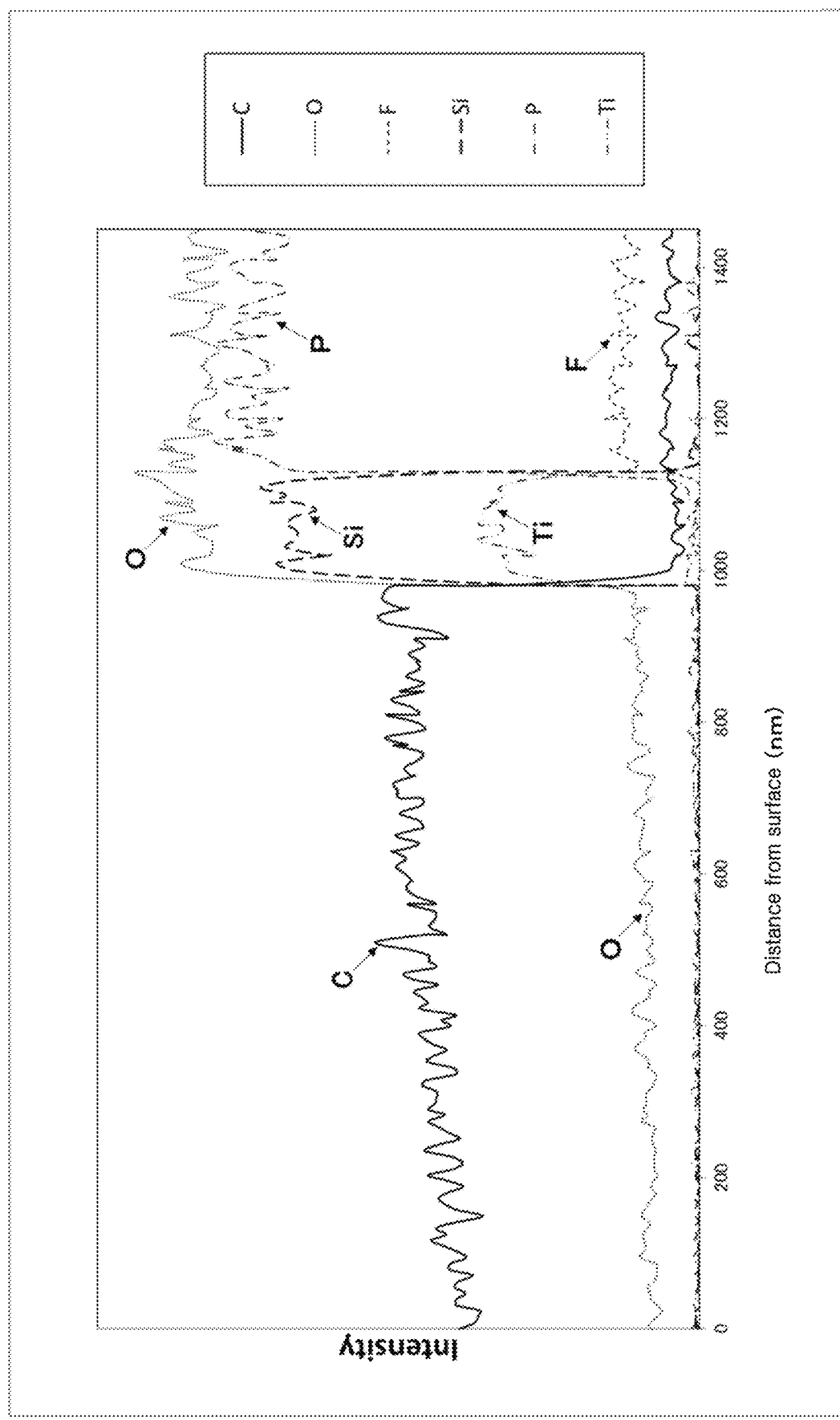
FIG. 4 illustrates STEM-EDX lines (EDX ray (K ray) detection intensity lines in a depth direction of each element constituting an optical filter) in an embodiment of an optical filter of the present disclosure.

FIG. 4 exemplifies STEM-EDX lines (EDX ray (K ray) detection intensity lines in a depth direction of each element constituting an optical filter) of the optical filter 1 according to the present disclosure measured under the aforementioned conditions. From the embodiment illustrated in FIG. 4, it can be confirmed that a resin layer (described below) including a C atom and an O atom, as main components, is formed in a region at a distance of 0 to 980 nm from a surface, a bonding layer including a Si atom, a Ti atom and an O atom, as main components, is formed in a region at a distance of 980 to 1150 nm from a surface, and an absorbing glass substrate including a P atom, a F atom, and an O atom, as main components, is formed a region at distance of more than 1150 nm from a surface. In addition, elements constituting each region, the thickness of the bonding layer, and the like can be confirmed from STEM-EDX lines.

From the embodiment illustrated in FIG. 4, it can be confirmed that the bonding layer of the optical filter 1 includes a Si atom and a Ti atom.

In the bonding layer constituting the optical filter 1 of the present disclosure, a ratio, α (atomic %), of a total atomic number of a Ti atom, a Zr atom, and an Al atom to a total number of a Si atom, a Ti atom, a Zr atom, and an Al atom (total atom number) is preferably greater than 0 atomic % and 33.3 atomic % or less, more preferably 9 to 33.3 atomic %, even more preferably 12 to 33.3 atomic %.

In the present specification, a ratio, α (atomic %), of a total atomic number of a Ti atom, a Zr atom, and an Al atom to a total number of a Si atom, a Ti atom, a Zr atom, and an Al atom (total atom number) constituting the bonding layer refers to a value obtained according to the following method:

(1) STEM-EDX of an optical filter is measured under the aforementioned measurement conditions to obtain STEM-EDX lines (EDX ray (K ray) detection intensity lines in a depth direction of each element constituting an optical filter) as illustrated in FIG. 4, (2) the integral strength of EDX rays of a Si atom, $X_{Si}$, the integral strength of EDX rays of a Ti atom, $X_{Ti}$, the integral strength of EDX rays of a Zr atom, $X_{Zr}$, and the integral strength of EDX rays of an Al atom, $X_{Al}$, are respectively obtained in a region constituting a bonding layer, and (3) a value obtained by multiplying each of the integral EDX ray strength values obtained in (2) by the k factor (a correction coefficient which differs according to an atomic number and depends upon acceleration voltage or detection efficiency. Hereinafter, the k factor of a Si atom is referred to as $K_{Si}$, the k factor of a Ti atom is referred to as $K_{Ti}$, the k factor of a Zr atom is referred to as $K_{Zr}$, and the k factor of an Al atom is referred to as $K_{Al}$, for convenience) may be considered to correspond to a weight ratio of each element. Accordingly, for example, a weight ratio of a Ti atom, $A_{Ti}$ (% by weight), constituting the bonding layer may be calculated according to the following equation:

$$A_{Ti} = \frac{(X_{Ti} \times K_{Ti})}{(X_{Si} \times K_{Si}) + (X_{Ti} \times K_{Ti}) + (X_{Zr} \times K_{Zr}) + (X_{Al} \times K_{Al})} \times 100 \quad \text{[Equation 1]}$$

(4) A value obtained by dividing a value, obtained by multiplying the integral strength, X, of EDX rays of each atom by the k factor, by a respective atomic weight, M, may be considered to correspond to an atomic number ratio of each constituent element. Accordingly, when the atomic weight of a Si atom is $M_{Si}$, the atomic weight of a Ti atom is $M_{Ti}$, the atomic weight of a Zr atom is $M_{Zr}$, and the atomic weight of an Al atom is $M_{Al}$, an atomic number ratio of a Ti atom, $\alpha_{Ti}$ (atomic %), constituting the bonding layer, for example, may be calculated according to the following equation:

$$\alpha_{Ti} = \frac{(X_{Ti} \times K_{Ti} \div M_{Ti})}{(X_{Si} \times K_{Si} \div M_{Si}) + (X_{Ti} \times K_{Ti} \div M_{Ti}) + (X_{Zr} \times K_{Zr} \div M_{Zr}) + (X_{Al} \times K_{Al} \div M_{Al})} \times 100 \quad \text{[Equation 2]}$$

In addition, a ratio, $\alpha$ (atomic %), of a total atomic number of a Ti atom, a Zr atom, and an Al atom constituting the bonding layer may be calculated according to the following equation:

$$\alpha = \frac{(X_{Ti} \times K_{Ti} \div M_{Ti}) + (X_{Zr} \times K_{Zr} \div M_{Zr}) + (X_{Al} \times A_{Al} \div M_{Al})}{(X_{Si} \times K_{Si} \div (M_{Si}) + (X_{Ti} \times K_{Ti} \div M_{Ti}) + (X_{Zr} \times K_{Zr} \div M_{Zr}) + (X_{Al} \times K_{Al} \div M_{Al})} \times 100 \quad \text{[Equation 3]}$$

For example, since a Si atom and a Ti atom are included in the bonding layer, but a Zr atom and an Al atom are excluded therefrom in the case of the embodiment illustrated in FIG. 4, a ratio, $\alpha$ (atomic %), of a total atomic number of a Ti atom, a Zr atom, and an Al atom constituting the bonding layer may be calculated according to the following equation:

$$\alpha = \frac{(X_{Ti} \times K_{Ti} \div M_{Ti})}{(X_{Si} \times K_{Si} \div M_{Si}) + (X_{Ti} \times K_{Ti} \div M_{Ti})} \times 100 \quad \text{[Equation 4]}$$

In the present specification, $K_{Si}$=1.000, $K_{Ti}$=1.033, $K_{Zr}$=5.696, and $K_{Al}$=1.050.

The optical filters 1-1 and 1-2 of the present disclosure are embodiments of the optical filter 1 of the present disclosure.

The optical filter 1-1 of the present disclosure is characterized in that a resin layer is provided on an absorbing glass substrate composed of phosphate-based glass or fluorophosphate-based glass through a bonding layer interposed between the resin layer and the absorbing glass substrate, wherein the bonding layer includes hydrolyzed and dehydrated condensates of one or more coupling agents selected from compounds represented by Formulas (I) and (II) below:

$$M(OSiR^1R^2R^3)_n \quad \text{(I)}$$

wherein M is a Ti atom, a Zr atom, or an Al atom, $R^1$, $R^2$ and $R^3$ are straight- or branched-chain hydrocarbon groups having 1 to 10 carbon atoms, which include or exclude an oxygen atom or a nitrogen atom, and are equal to or different from each other, n is 4 when M is a Ti atom or a Zr atom, or 3 when M is an Al atom, a plurality of —$OSiR^1R^2R^3$ groups are equal to or different from each other, and $$(Ti_kO_{k-1})(OSiR^4R^5R^6)_{2k+2} \quad \text{(II)}$$

wherein $R^4$, $R^5$ and $R^6$ are straight- or branched-chain hydrocarbon groups having 1 to 10 carbon atoms, which include or exclude an oxygen atom or a nitrogen atom, and are equal to or different from each other, k is a real number between 2 and 15, and a plurality of —$OSiR^4R^5R^6$ groups are equal to or different from each other.

In addition, the optical filter 1-2 of the present disclosure is characterized in that a resin layer is provided on an absorbing glass substrate composed of phosphate-based glass or fluorophosphate-based glass through a bonding layer interposed between the resin layer and the absorbing glass substrate, wherein the bonding layer includes hydrolyzed and dehydrated condensates of one or more coupling agents selected from compounds represented by Formulas (III) and (IV) below:

$$M\{OSi(OR^7)(OR^8)(OR^9)\}_n \quad \text{(III)}$$

wherein M is a Ti atom, a Zr atom, or an Al atom, $R^7$, $R^8$ and $R^9$ are straight- or branched-chain hydrocarbon groups having 1 to 10 carbon atoms and are equal to or different from each other, n is 4 when M is a Ti atom or a Zr atom, or 3 when M is an Al atom, and a plurality of —$OSi(OR^7)(OR^8)(OR^9)$ groups are equal to or different from each other, and $$(Ti_kO_{k-1})\{OSi(OR^{10})(OR^{11})(OR^{12})\}_{2k+2} \quad \text{(IV)}$$

wherein $R^{10}$, $R^{11}$ and $R^{12}$ are straight- or branched-chain hydrocarbon groups having 1 to 10 carbon atoms and are equal to or different from each other, k is a real number between 2 and 15, a plurality of —$OSi(OR^{10})(OR^{11})(OR^{12})$ groups are equal to or different from each other.

The compound represented by Formula (III) as a component of the bonding layer is a specific form of the compound represented by Formula (I), and the compound represented by Formula (IV) as a component of the bonding layer is a specific form of the compound represented by Formula (II).

Accordingly, in the following description of the optical filter 1 of the present disclosure, the compounds represented by Formula (I) and (III) and the compounds represented by Formulas (II) and (IV), components of the bonding layer, are sequentially described to describe a method of forming the bonding layer.

In the optical filter 1 of the present disclosure, M constituting a compound represented by Formula (I) below may be a Ti atom, a Zr atom, or an Al atom, and is preferably a Ti atom:

$$M(OSiR^1R^2R^3)_n \qquad (I)$$

In the compound represented by Formula (I), $R^1$, $R^2$ and $R^3$ may be straight- or branched-chain hydrocarbon groups having 1 to 10 carbon atoms which include or exclude an oxygen atom or a nitrogen atom, preferably straight- or branched-chain hydrocarbon groups having 1 to 4 carbon atoms which include or exclude an oxygen atom or a nitrogen atom, more preferably straight- or branched-chain hydrocarbon groups having 1 to 3 carbon atoms which include or exclude an oxygen atom or a nitrogen atom.

Particularly, $R^1$, $R^2$ and $R^3$ may be selected from straight- or branched-chain or cyclic hydrocarbon groups such as a methyl group, an ethyl group, a propyl group, a butyl group, a pentyl group, a hexyl group, a heptyl group, an octyl group, a nonyl group, and a decyl group. More particularly, $R^1$, $R^2$ and $R^3$ may be selected from straight-, branched-chain, or cyclic hydrocarbon groups such as $-C_3H_6(COO)CHCH_2$, $-CH_2(COO)CHCH_2$, $-C_2H_4(COO)CHCH_2$, $-C_4H_8(COO)CHCH_2$, $-C_5H_{10}(COO)CHCH_2$, $-C_6H_{12}(COO)CHCH_2$, $-C_7H_{14}(COO)CHCH_2$, $-C_8H_{16}(COO)CHCH_2$, $-C_9H_{18}(COO)CHCH_2$, and $-C_{10}H_{20}(COO)CHCH_2$.

In the optical filter 1 according to the present disclosure, when the number of carbon atoms of each of $R^1$, $R^2$ and $R^3$ is within the above range, an appropriate reaction rate between a silicon compound and a metal alkoxide may be easily maintained, and a more uniform coupling agent may be easily prepared.

In the compound represented by Formula (I), functional groups represented by $R^1$, $R^2$ and $R^3$ bonded to a silicon atom may affect bonding between the resin layer and the bonding layer. Accordingly, bonding between the resin layer and the bonding layer may be controlled by appropriately selecting $R^1$, $R^2$ and $R^3$ groups according to a resin layer type provided on the bonding layer.

Here, $R^1$, $R^2$ and $R^3$ may be equal to or different from each other.

In addition, n may be 4 when M is a Ti or Zr atom or may be 3 when M is an Al atom, a plurality of $-OSiR^1R^2R^3$ groups may be equal to or different from each other.

In the optical filter 1 of the present disclosure, the compound represented by Formula (I) may be a compound represented by Formula (III) below:

$$M\{OSi(OR^7)(OR^8)(OR^9)\}_n \qquad (III)$$

wherein M is a Ti atom, a Zr atom, or an Al atom, $R^7$, $R^8$ and $R^9$ are straight- or branched-chain hydrocarbon groups having 1 to 10 carbon atoms and are equal to or different from each other, n is 4 when M is a Ti atom or a Zr atom, or 3 when M is an Al atom, and a plurality of $-OSi(OR^7)(OR^8)(OR^9)$ groups are equal to or different from each other.

In the compound represented by Formula (III), M may be a Ti atom, a Zr atom, or an Al atom, and is preferably a Ti atom.

In the compound represented by Formula (III), $R^7$, $R^8$ and $R^9$ may be straight- or branched-chain hydrocarbon groups having 1 to 10 carbon atoms, preferably straight- or branched-chain hydrocarbon groups having 1 to 4 carbon atoms, more preferably straight- or branched-chain hydrocarbon groups having 1 to 3 carbon atoms.

Particularly, $R^7$, $R^8$ and $R^9$ may be selected from straight- or branched-chain or cyclic hydrocarbon groups such as a methyl group, an ethyl group, a propyl group, a butyl group, a pentyl group, a hexyl group, a heptyl group, an octyl group, a nonyl group, and a decyl group.

$R^7$, $R^8$ and $R^9$ may be equal to or different from each other

In the optical filter 1 according to the present disclosure, when the number of carbon atoms of each of $R^7$, $R^8$ and $R^9$ is within the above range, an appropriate reaction rate between a silicon compound and a metal alkoxide may be easily maintained and a more uniform coupling agent may be easily prepared $R^7$, $R^8$ and $R^9$ may be equal to or different from each other.

In addition, n may be 4 when M is a Ti or Zr atom or may be 3 when M is an Al atom, and a plurality of $-OSi(OR^7)(OR^8)(OR^9)$ groups may be equal to or different from each other.

The coupling agent represented by Formula (III) is preferably is a reaction product between a silicon compound represented by Formula (V) below and one or more selected from metal alkoxides represented by Formulas (VI), (VII), and (VIII) below:

$$Si(OR^7)(OR^8)(OR^9)OH \qquad (V)$$

wherein $R^7$, $R^8$ and $R^9$ are straight- or branched-chain hydrocarbon groups having 1 to 10 carbon atoms and are equal to or different from each other, $$Ti(OR^{13})(OR^{14})(OR^{15})(OR^{16}) \qquad (VI)$$

wherein $R^{13}$, $R^{14}$, $R^{15}$ and $R^{16}$ are straight- or branched-chain hydrocarbon groups having 1 to 10 carbon atoms and are equal to or different from each other, $$Zr(OR^{17})(OR^{18})(OR^{19})(OR^{20}) \qquad (VII)$$

wherein $R^{17}$, $R^{18}$, $R^{19}$ and $R^{20}$ are straight- or branched-chain hydrocarbon groups having 1 to 10 carbon atoms and are equal to or different from each other, and $$Al(OR^{21})(OR^{22})(OR^{23}) \qquad (VIII)$$

wherein $R^{21}$, $R^{22}$ and $R^{23}$ are straight- or branched-chain hydrocarbon groups having 1 to 10 carbon atoms and are equal to or different from each other.

In the silicon compound represented by Formula (V), the number of carbon atoms of $R^7$, $R^8$ and $R^9$ or specific examples thereof are the same as those described above, and $R^7$, $R^8$ and $R^9$ may be equal to or different from each other The silicon compound represented by Formula (V) may be easily generated by partially hydrolyzing a corresponding silane alkoxide as in the following reaction scheme:

$$Si(OR^7)(OR^8)(OR^9)(OR^a)+H_2O \rightarrow Si(OR^7)(OR^8)(OR^9)OH+R^aOH$$

(wherein $R^7$, $R^8$, $R^9$ and $R^a$ are straight- or branched-chain hydrocarbon groups having 1 to 10 carbon atoms and are equal to or different from each other.) Preferred examples of the hydrocarbon groups, $R^7$, $R^8$ and $R^9$, are the same as those described above. Preferred examples of $R^a$ are also the same as those described for the hydrocarbon groups $R^7$, $R^8$ and $R^9$.

When the silane alkoxide is completely hydrolyzed, the following reaction proceeds, thereby generating silanol, $Si(OH)_4$:

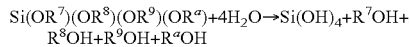

Meanwhile, the silane alkoxide may be partially hydrolyzed by controlling the amount of moisture used to hydrolyze the same, whereby the silicon compound represented by Formula (V) described above may be obtained.

In the titanium alkoxide represented by Formula (VI), $Ti(OR^{13})(OR^{14})(OR^{15})(OR^{16})$, the zirconium alkoxide represented by Formula (VII), $Zr(OR^{17})(OR^{18})(OR^{19})(OR^{20})$, and the aluminum alkoxide represented by Formula (VIII), $Al(OR^{21})(OR^{22})(OR^{23})$, $R^{13}$ to $R^{23}$ ($R^{13}$, $R^{14}$, $R^{15}$, $R^{16}$, $R^{17}$, $R^{18}$, $R^{19}$, $R^{20}$, $R^{21}$, $R^{22}$ and $R^{23}$) are straight- or branched-chain hydrocarbon groups having 1 to 10 carbon atoms, preferably straight- or branched-chain hydrocarbon groups having 2 to 9 carbon atoms, more preferably straight- or branched-chain hydrocarbon groups having 3 to 8 carbon atoms.

Particularly, $R^{13}$, $R^{14}$, $R^{15}$, $R^{16}$, $R^{17}$, $R^{18}$, $R^{19}$, $R^{20}$, $R^{21}$, $R^{22}$, $R^{23}$ may be selected from straight- or branched-chain or cyclic hydrocarbon groups such as a methyl group, an ethyl group, a propyl group, a butyl group, a pentyl group, a hexyl group, a heptyl group, an octyl group, a nonyl group, and a decyl group.

$R^{13}$, $R^{14}$, $R^{15}$, $R^{16}$, $R^{17}$, $R^{18}$, $R^{19}$, $R^{20}$, $R^{21}$, $R^{22}$ and $R^{23}$ may be equal to or different from each other.

In the optical filter 1 according to the present disclosure, stability against moisture of the metal alkoxide may be efficiently increased when the number of carbon atoms of $R^{13}$, $R^{14}$, $R^{15}$, $R^{16}$, $R^{17}$, $R^{18}$, $R^{19}$, $R^{20}$, $R^{21}$, $R^{22}$ or $R^{23}$ is 2 or more. When the number of carbon atoms of $R^{13}$, $R^{14}$, $R^{15}$, $R^{16}$, $R^{17}$, $R^{18}$, $R^{19}$, $R^{20}$, $R^{21}$, $R^{22}$ or $R^{23}$ is 9 or less, an increase in the viscosity of the metal alkoxide may be suppressed, and thus, handling properties may be efficiently increased.

For example, reaction between a silicon compound represented by the formula $Si(OR^7)(OR^8)(OR^9)OH$ and titanium alkoxide, $Ti(OR^{13})(OR^{14})(OR^{15})(OR^{16})$, represented by Formula (VI) may be considered to proceed as follows:

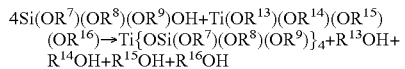

When reaction is allowed under a condition where the silicon compound represented by the formula $Si(OR^7)(OR^8)(OR^9)OH$ is present in an amount of 4 moles, i.e., in an excessive amount, with respect to 1 mole of the titanium alkoxide represented by the formula $Ti(OR^{13})(OR^{14})(OR^{15})(OR^{16})$, in a reaction system, all of the titanium alkoxide present in the reaction system is considered as reacting according to the above reaction scheme.

The optical filter 1 according to the present disclosure includes an absorbing glass substrate; a resin layer; and a bonding layer interposed between the absorbing glass substrate and the resin, wherein the bonding layer includes a hydrolyzed and dehydrated condensate of a coupling agent including a compound represented by Formula (III) below, and the resin layer will be described:

$$M\{OSi(OR^7)(OR^8)(OR^9)\}_n \qquad (III)$$

wherein M is a Ti atom, a Zr atom, or an Al atom, $R^7$, $R^8$ and $R^9$ are straight- or branched-chain hydrocarbon groups having 1 to 10 carbon atoms and are equal to or different from each other, n is 4 when M is a Ti or Zr atom, or 3 when M is an Al atom, and a plurality of $-OSi(OR^7)(OR^8)(OR^9)$ groups are equal to or different from each other.

For example, a case wherein the coupling agent composed of the compound represented by Formula (III) is $Ti\{OSi(OR^7)(OR^8)(OR^9)\}_4$ is described below. The coupling agent is hydrolyzed by adding water to this system as in the following reaction scheme:

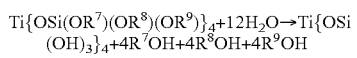

The hydrolysis reaction may be performed, for example, at 10 to 40° C. in the presence of an appropriate amount of water using an appropriate catalyst such as HCl.

Next, the absorbing glass substrate is coated with a coating solution including a hydrolysate of the coupling agent that is composed of the compound represented by Formula (III), thereby forming a coating film.

The concentration of the coupling agent composed of the compound represented by Formula (III) in the coating solution is preferably 0.1 to 10.0% by mass. In addition, the amount of the coating solution coated on the absorbing glass substrate is preferably 0.01 to 0.10 ml/cm².

The coating solution containing a hydrolysate of the coupling agent may be coated by one or more methods selected from an immersion coating method, a cast coating method, a spray coating method, a spin coating method, and the like.

Next, the coating film is coated with a coating solution for forming a resin layer, thereby forming an absorbing resin coating film. The coating solution for forming a resin layer is described below. Next, heating is appropriately performed, thereby generating a reaction product represented by $[-Ti(OSiO_3)_3-]_n$, wherein n is a positive integer, as a dehydrated condensate of a hydrolysate of a coupling agent.

It is considered that the dehydrated condensate causes the coupling agent to strongly bind to each other or causes the coupling agent to strongly bind with an absorbing glass or a resin layer. Accordingly, the present disclosure can easily provide the optical filter 1 comprising an absorbing glass substrate composed of phosphate-based glass or fluorophosphate glass having a resin layer provided thereon with high adhesion.

The bonding layer of the optical filter 1 of the present disclosure may further include a hydrolyzed and dehydrated condensate of silanol.

That is, when silanol, $Si(OH)_4$, is appropriately heated, a dehydrated condensate, $(Si-O-Si)_2$, is generated as in the following reaction scheme:

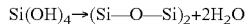

The present inventors have understood that adhesion to an absorbing glass substrate or a resin layer is often insufficient, particularly in the copresence of moisture, when the dehydrated condensate of silanol is used alone, but adhesion is improved due to complementary actions between dehydrated condensates when a dehydrated condensate obtained by dehydrating and condensing a hydrolysate of the coupling agent composed of the compound represented by Formula (I) or (III) is used along with the dehydrated condensate of silanol.

The silanol is added to a coating solution including the hydrolysate of the coupling agent composed of the compound represented by Formula (I) or (III), and then an absorbing glass substrate is coated with the resulting coating solution to form a coating film. Next, heating is appropriately performed, thereby generating a dehydrated condensate of the silanol along with a dehydrated condensate [—Ti(OSiO$_3$)$_3$-]$_n$ (wherein n is a positive integer) of the hydrolysate of the coupling agent.

The optical filter 1 of the present disclosure comprises preferably an absorbing glass substrate composed of phosphate-based glass or fluorophosphate-based glass; a resin layer; and a bonding layer interposed between the resin layer and the absorbing glass substrate, wherein the bonding layer includes a hydrolyzed and dehydrated condensate of a coupling agent composition including a reaction product between 50 mol % or more and less than 100 mol % of a silicon compound represented by Formula (V) below and greater than 0 mol % and 50 mol % or less of one or more selected from metal alkoxides represented by Formulas (VI), (VII), and (VIII) below:

$$\text{Si(OR}^7\text{)(OR}^8\text{)(OR}^9\text{)OH} \qquad (V)$$

wherein R$^7$, R$^8$ and R$^9$ are straight- or branched-chain hydrocarbon groups having 1 to 10 carbon atoms and are equal to or different from each other,

$$\text{Ti(OR}^{13}\text{)(OR}^{14}\text{)(OR}^{15}\text{)(OR}^{16}\text{)} \qquad (VI)$$

wherein R$^{13}$, R$^{14}$, R$^{15}$ and R$^{16}$ are straight- or branched-chain hydrocarbon groups having 1 to 10 carbon atoms and are equal to or different from each other,

$$\text{Zr(OR}^{17}\text{)(OR}^{18}\text{)(OR}^{19}\text{)(OR}^{20}\text{)} \qquad (VII)$$

wherein R$^{17}$, R$^{18}$, R$^{19}$ and R$^{20}$ are straight- or branched-chain hydrocarbon groups having 1 to 10 carbon atoms and are equal to or different from each other, and

$$\text{Al(OR}^{21}\text{)(OR}^{22}\text{)(OR}^{23}\text{)} \qquad (VIII)$$

wherein R$^{21}$, R$^{22}$ and R$^{23}$ are straight- or branched-chain hydrocarbon groups having 1 to 10 carbon atoms and are equal to or different from each other.

When the amount of the metal alkoxide is 50 mol % or less, a coating property of the resulting coupling agent may be effectively improved.

In the optical filter 1 according to the present disclosure, the coupling agent composition is preferably a composition generated by reaction between 50 mol % or more and less than 100 mol % of the silicon compound represented by Formula (V) and greater than 0 mol % and 50 mol % or less of one or more metal alkoxides selected from Formulas (VI), (VII), and (VIII), more preferably a composition generated by reaction between greater than 80 mol % and less than 100 mol % of the silicon compound represented by Formula (V) and greater than 0 mol % and less than 20 mol % of one or more metal alkoxides selected from Formulas (VI), (VII), and (VIII), even more preferably a composition generated by reaction between 85 to 94 mol % of the silicon compound represented by Formula (V) and 6 to 15 mol % of one or more metal alkoxides selected from Formulas (VI), (VII), and (VIII).

When the silicon compound represented by Formula (V) is reacted with one or more metal alkoxides selected from Formulas (VI), (VII), and (VIII) at an amount within the above ranges, a uniform, smooth, and peeling-resistant film may be easily formed.

Descriptions of the absorbing glass substrate, the silicon compound represented by Formula (V), and the metal alkoxides represented by Formulas (VI), (VII), and (VIII) are the same as those described above.

In the optical filter 1 according to the present disclosure, when the coupling agent composition is a reaction product obtained by reacting the silicon compound represented by Formula (V) with the metal alkoxides represented by Formulas (VI), (VII), and (VIII) within the above ranges, a uniform coating solution including the coupling agent composition may be easily prepared and a uniform film may be easily formed.

As described above, for example, a reaction between a silicon compound, Si(OR$^7$)(OR$^8$)(OR$^9$)OH, represented by Formula (V), and titanium alkoxide, Ti(OR$^{13}$)(OR$^{14}$)(OR$^{15}$)(OR$^{16}$), represented by Formula (VI) proceeds according to the following reaction scheme:

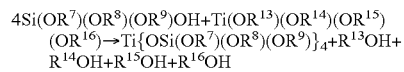

$$4\text{Si(OR}^7\text{)(OR}^8\text{)(OR}^9\text{)OH}+\text{Ti(OR}^{13}\text{)(OR}^{14}\text{)(OR}^{15}\text{)} \\ \text{(OR}^{16}\text{)}\rightarrow\text{Ti\{OSi(OR}^7\text{)(OR}^8\text{)(OR}^9\text{)\}}_4+\text{R}^{13}\text{OH}+ \\ \text{R}^{14}\text{OH}+\text{R}^{15}\text{OH}+\text{R}^{16}\text{OH}$$

When the silicon compound is reacted in an amount of 4 moles or more with respect to 1 mole of the titanium alkoxide, i.e., when reaction proceeds in the presence of a large amount of silicon compound, the titanium alkoxide present in a reaction system completely participates in the reaction according to the reaction scheme. On the other hand, when the amount of the silicon compound is less than 4 moles with respect to 1 mole of the titanium alkoxide, alkoxy groups (OR$^{13}$ group, OR$^{14}$ group, OR$^{15}$ group, and OR$^{16}$ group) remain in a generated titanium compound. When the amount of a titanium compound in which the alkoxy groups remain is large, a titanium compound precipitates in a coating solution, which makes it difficult to form a uniform film. Accordingly, it is preferred to use a coupling agent composition prepared through reaction in the presence of a large amount, i.e., a larger amount than a theoretical amount, of silicon compound.

As described above, Ti{OSi(OR$^7$)(OR$^8$)(OR$^9$)}$_4$ generated through the reaction is hydrolyzed in the presence of a suitable catalyst composed of inorganic acid such as HCl, thereby causing hydrolysis reaction according to the following reaction scheme:

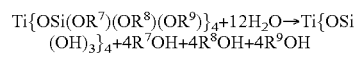

$$\text{Ti\{OSi(OR}^7\text{)(OR}^8\text{)(OR}^9\text{)\}}_4+12\text{H}_2\text{O}\rightarrow\text{Ti\{OSi} \\ \text{(OH)}_3\}_4+4\text{R}^7\text{OH}+4\text{R}^8\text{OH}+4\text{R}^9\text{OH}$$

Here, hydrolysis reaction occurs according to the following reaction scheme when the silicon compound represented by Formula (V) is present in a large amount in the reaction system, thereby generating silanol Si(OH)$_4$:

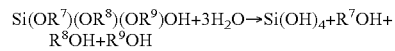

$$\text{Si(OR}^7\text{)(OR}^8\text{)(OR}^9\text{)OH}+3\text{H}_2\text{O}\rightarrow\text{Si(OH)}_4+\text{R}^7\text{OH}+ \\ \text{R}^8\text{OH}+\text{R}^9\text{OH}$$

A hydrolyzed and dehydrated condensate, [—Ti(OSiO$_3$)$_3$-]$_n$ (wherein n is a positive integer), of the hydrolysate may be obtained by appropriately heating the hydrolysate, Ti{OSi(OH)$_3$}$_4$, as described above.

In addition, dehydration condensation reaction according to the following reaction scheme occurs when silanol, Si(OH)$_4$, generated through the hydrolysis reaction, is appropriately heated as described above, whereby a dehydrated condensate, (Si—O—Si)$_2$, is generated:

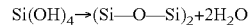

$$\text{Si(OH)}_4\rightarrow(\text{Si—O—Si})_2+2\text{H}_2\text{O}$$

When the dehydrated condensate of silanol is used alone, adhesion to an absorbing glass substrate or a resin layer is often insufficient in the copresence of moisture. However, adhesion to an absorbing glass substrate and the like is improved due to complementary actions between dehydrated condensates when the dehydrated condensate of silanol is used along with the dehydrated condensate of the hydrolysate Ti {OSi(OH)$_3$}$_4$ of the coupling agent.

The coupling agent composition may contain any ingredients, such as a reaction catalyst, a pH adjuster, a leveling agent, and a defoamer, other than a reaction product between the silicon compound represented by Formula (V) and the metal alkoxide represented by Formula (VI), (VII) or (VII).

In the optical filter 1 of the present disclosure, a compound represented by Formula (II) below differs from the compound of Formula (I) described above and has a multimeric structure (—Ti—O—Ti—) including two or more Ti atoms:

$$(Ti_kO_{k-1})(OSiR^4R^5R^6)_{2k+2} \quad (II)$$

wherein M is a Ti atom, a Zr atom, or an Al atom, $R^1$, $R^2$ and $R^3$ are straight- or branched-chain hydrocarbon groups having 1 to 10 carbon atoms, which include or exclude an oxygen atom or a nitrogen atom, and are equal to or different from each other, n is 4 when M is a Ti atom or a Zr atom, or 3 when M is an Al atom, a plurality of —OSiR$^1$R$^2$R$^3$ groups are equal to or different from each other.

In the compound represented by Formula (II), $R^4$, $R^5$ and $R^6$ are straight- or branched-chain hydrocarbon groups having 1 to 10 carbon atoms which include or exclude an oxygen atom or a nitrogen atom, preferably straight- or branched-chain hydrocarbon groups having 1 to 4 carbon atoms which include or exclude an oxygen atom or a nitrogen atom, more preferably straight- or branched-chain hydrocarbon groups having 1 to 3 carbon atoms which include or exclude an oxygen atom or a nitrogen atom.

Particularly, $R^4$, $R^5$ and $R^6$ may be selected from straight- or branched-chain or cyclic hydrocarbon groups such as a methyl group, an ethyl group, a propyl group, a butyl group, a pentyl group, a hexyl group, a heptyl group, an octyl group, a nonyl group, and a decyl group. More particularly, $R^4$, $R^5$ and $R^6$ may be selected from straight-, branched-chain, or cyclic hydrocarbon groups such as —C$_3$H$_6$(COO)CHCH$_2$, —CH$_2$(COO)CHCH$_2$, —C$_2$H$_4$(COO)CHCH$_2$, —C$_4$H$_8$(COO)CHCH$_2$, —C$_5$H$_{10}$(COO)CHCH$_2$, —C$_6$H$_{12}$(COO)CHCH$_2$, —C$_7$H$_{14}$(COO)CHCH$_2$, —C$_8$H$_{16}$(COO)CHCH$_2$, —C$_9$H$_{18}$(COO)CHCH$_2$, and —C$_{10}$H$_{20}$(COO)CHCH$_2$.

In the compound represented by Formula (II), when the number of carbon atoms of each of $R^4$, $R^5$ and $R^6$ is within the above range, an appropriate reaction rate between a silicon compound and a metal alkoxide may be easily maintained and a more uniform coupling agent may be easily prepared.

In addition, in the compound represented by Formula (II), functional groups represented by $R^4$, $R^5$ and $R^6$ bonded to a silicon atom may affect bonding between the resin layer and the bonding layer. Accordingly, bonding between the resin layer and the bonding layer may be controlled by appropriately selecting $R^4$, $R^5$ and $R^6$ groups according to a resin layer type provided on the bonding layer.

In the compound represented by Formula (II), k is a real number between 2 and 15, more preferably a real number of 4 or more and 10 or less, particularly preferably 4, 7, or 10.

In the compound represented by Formula (II), a resin layer having high adhesion to the absorbing glass substrate composed of phosphate-based glass or fluorophosphate glass may be easily prepared when k is within the above range.

In the compound represented by Formula (II), $R^4$, $R^5$ and $R^6$ may be equal to or different from each other.

In addition, the plurality of —OSiR$^4$R$^5$R$^6$ groups may be equal to or different from each other In the optical filter 1 of the present disclosure, the compound represented by Formula (II) may be a compound represented by Formula (IV) below:

$$(Ti_kO_{k-1})\{OSi(OR^{10})(OR^{11})(OR^{12})\}_{2k+2} \quad (IV)$$

wherein $R^{10}$, $R^{11}$ and $R^{12}$ are straight- or branched-chain hydrocarbon groups having 1 to 10 carbon atoms and are equal to or different from each other, k is a real number between 2 and 15, and a plurality of —OSi(OR$^1$)(OR$^{11}$)(OR$^{12}$) groups are equal to or different from each other.

$R^{10}$, $R^{11}$ and $R^{12}$ constituting the compound represented by Formula (IV) are straight- or branched-chain hydrocarbon groups having 1 to 10 carbon atoms, preferably straight- or branched-chain hydrocarbon groups having 1 to 4 carbon atoms, more preferably straight- or branched-chain hydrocarbon groups having 1 to 3 carbon atoms.

Particularly, $R^{10}$, $R^{11}$ and $R^{12}$ may be selected from straight- or branched-chain or cyclic hydrocarbon groups such as a methyl group, an ethyl group, a propyl group, a butyl group, a pentyl group, a hexyl group, a heptyl group, an octyl group, a nonyl group, and a decyl group.

$R^{10}$, $R^{11}$ and $R^{12}$ may be equal to or different from each other

In the compound represented by Formula (IV), when the number of carbon atoms of each of $R^{10}$, $R^{11}$ and $R^{12}$ is within the above range, an appropriate reaction rate between a silicon compound and a metal alkoxide may be easily maintained and a more uniform coupling agent may be easily prepared.

In the compound represented by Formula (IV), k is a real number between 2 and 15, more preferably a real number of 4 or more and 10 or less, particularly preferably 4, 7, or 10.

In addition, the plurality of —OSi(OR$^{10}$)(OR$^{11}$)(OR$^{12}$) groups may be equal to or different from each other.

In the compound represented by Formula (IV), a resin layer having high adhesion to the absorbing glass substrate composed of phosphate-based glass or fluorophosphate glass may be easily prepared when k is within the range.

In the compound represented by Formula (IV), a case wherein k is 2 may be represented by the following formula:

[Formula 1]

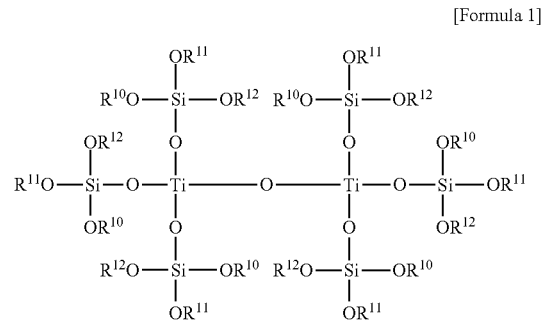

wherein a plurality of $R^{10}$, $R^{11}$ and $R^{12}$ are equal to or different from each other, and a plurality of —OSi(OR$^{10}$)(OR$^{11}$)(OR$^{12}$) groups are equal to or different from each other.

In the compound represented by Formula (IV), a case wherein k is 3 may be represented by the following formula:

[Formula 2]

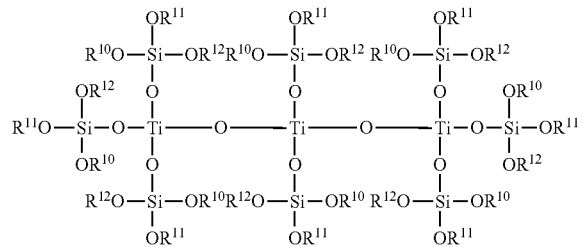

wherein a plurality of $R^{10}$, $R^{11}$ and $R^{12}$ are equal to or different from each other, and a plurality of —OSi$(OR^{10})(OR^{11})(OR^{12})$ groups are equal to or different from each other.

The coupling agent represented by Formula (IV) is preferably is a reaction product between a silicon compound represented by Formula (IX) below and tetrahydroxy titanium represented by Ti(OH)$_4$:

$$Si(OR^{10})(OR^{11})(OR^{12})OH \qquad (IX)$$

wherein $R^{10}$, $R^{11}$ and $R^{12}$ are straight- or branched-chain hydrocarbon groups having 1 to 10 carbon atoms and are equal to or different from each other.

In the silicon compound represented by Formula (IX), the number of carbon atoms of $R^{10}$, $R^{11}$ and $R^{12}$ or specific examples thereof are the same as those described above, and $R^{10}$, $R^{11}$ and $R^{12}$ may be equal to or different from each other.

A reaction between the silicon compound represented by Formula (IX) $Si(OR^{10})(OR^{11})(OR^{12})OH$ and the tetrahydroxy titanium represented by Ti(OH)$_4$ is considered to proceed as follows:

$$6Si(OR^{10})(OR^{11})(OR^{12})OH + 2Ti(OH)_4 \rightarrow Ti_2O\{OSi(OR^{10})(OR^{11})(OR^{12})\}_6 + 4H_2O$$

A compound represented by $Ti_2O\{OSi(OR^{10})(OR^{11})(OR^{12})\}_6$ obtained by the reaction corresponds to a case wherein k is 2 in the compound represented by Formula (IV).

When reaction is allowed under a condition where the silicon compound represented by the formula $Si(OR^{10})(OR^{11})(OR^{12})OH$ is present in an amount of 6 moles, i.e., in an excessive amount, with respect to 2 moles of tetrahydroxy titanium (Ti(OH)$_4$), in a reaction system, all of the tetrahydroxy titanium present in the reaction system is considered as reacting according to the above reaction scheme.

The optical filter 1 according to the present disclosure comprises preferably an absorbing glass substrate; a resin layer; and a bonding layer interposed between the absorbing glass substrate and the resin layer, wherein the bonding layer includes hydrolyzed and dehydrated condensates of one or more coupling agents selected from compounds represented by Formula (IV) below:

$$(Ti_kO_{k-1})\{OSi(OR^{10})(OR^{11})(OR^{12})\}_{2k+2} \qquad (IV)$$

wherein $R^{10}$, $R^{11}$ and $R^{12}$ are straight- or branched-chain hydrocarbon groups having 1 to 10 carbon atoms and are equal to or different from each other, k is a real number between 2 and 15, and a plurality of —OSi$(OR^{10})(OR^{11})(OR^{12})$ groups are equal to or different from each other.

For example, a case wherein a coupling agent composed of the compound represented by Formula (IV) is $Ti_2O\{OSi(OR^{10})(OR^{11})(OR^{12})\}_6$ (when k is 2 in the compound represented by Formula (IV)) is described below. The coupling agent is hydrolyzed by adding water to this system as in the following reaction scheme:

$$Ti_2O\{OSi(OR^{10})(OR^{11})(OR^{12})\}_6 + 18H_2O \rightarrow Ti_2O\{OSi(OH)_3\}_6 + 6R^{10}OH + 6R^{11}OH + 6R^{12}OH$$

The hydrolysis reaction may be performed, for example, at 10 to 40° C. in the presence of an appropriate amount of water appropriately using a catalyst such as HCl.

Next, the absorbing glass substrate is coated with a coating solution including a hydrolysate of the coupling agent that is composed of the compound represented by Formula (V), thereby forming a coating film.

The concentration of the coupling agent composed of the compound represented by Formula (IV) in the coating solution is preferably 0.5 to 20% by mass. In addition, the amount of the coating solution coated on the absorbing glass substrate is preferably 0.005 to 0.5 ml/cm$^2$.

The coating solution containing a hydrolysate of the coupling agent may be coated by one or more methods selected from an immersion coating method, a cast coating method, a spray coating method, a spin coating method, and the like.

Next, the coating film is coated with a coating solution for forming a resin layer, thereby forming an absorbing resin coating film. The coating solution for forming a resin layer is described below. Next, heating is appropriately performed, thereby generating a reaction product represented by [—(TiO$_3$)$_2$(SiO$_3$)$_5$-]$_m$ (wherein m is a positive integer) as a dehydrated condensate of a hydrolysate.

It is considered that the dehydrated condensate makes particles of the coupling agent to strongly bind to each other or makes the coupling agent to strongly bind with an absorbing glass or a resin layer. Accordingly, the present disclosure can easily provide the optical filter 1 comprising an absorbing glass substrate composed of phosphate-based glass or fluorophosphate glass having a resin layer provided thereon with high adhesion.

The bonding layer of the optical filter 1 of the present disclosure may further include a hydrolyzed and dehydrated condensate of silanol as described above.

That is, when silanol, Si(OH)$_4$, is appropriately heated, a dehydrated condensate, (Si—O—Si)$_2$, is generated as in the following reaction scheme:

$$Si(OH)_4 \rightarrow (Si—O—Si)_2 + 2H_2O$$

The present inventors have understood that adhesion to an absorbing glass substrate or a resin layer is often insufficient, particularly in the copresence of moisture, when the dehydrated condensate of silanol is used alone, but the adhesion is improved due to complementary actions between dehydrated condensates when a dehydrated condensate obtained by dehydrating and condensing a hydrolysate of the coupling agent composed of the compound represented by Formula (II) or (IV) is used along with the dehydrated condensate of silanol.

The silanol is added to a coating solution including the hydrolysate of the coupling agent composed of the compound represented by Formula (II) or (IV), and then an absorbing glass substrate is coated with the resulting coating solution to form a coating film. Next, heating is appropriately performed, thereby generating a dehydrated condensate of the silanol along with a dehydrated condensate of the hydrolysate of the coupling agent.

Hereinafter, the optical filter 2 of the present disclosure is described.

The optical filter 2 of the present disclosure includes an absorbing glass substrate composed of phosphate-based glass or fluorophosphate-based glass; and a resin layer, wherein the resin layer includes a Si atom and one or more selected from a Ti atom, a Zr atom, and an Al atom, and is provided on the absorbing glass substrate. As a particular embodiment, an optical filter 2-1 or 2-2 of the present disclosure is described below.

The optical filter 2-1 of the present disclosure is characterized in that a resin layer including hydrolyzed and dehydrated condensates of one or more coupling agents selected from compounds represented by Formulas (I) and (II) below is provided on the absorbing glass substrate composed of phosphate-based glass or fluorophosphate-based glass:

$$M(OSiR^1R^2R^3)_n \qquad (I)$$

wherein M is a Ti atom, a Zr atom, or an Al atom, $R^1$, $R^2$ and $R^3$ are straight- or branched-chain hydrocarbon groups having 1 to 10 carbon atoms, which include or exclude an oxygen atom or a nitrogen atom, and are equal to or different from each other, n is 4 when M is a Ti atom or a Zr atom, or 3 when M is an Al atom, a plurality of —$OSiR^1R^2R^3$ groups are equal to or different from each other, and

$$(Ti_kO_{k-1})(OSiR^4R^5R^6)_{2k+2} \qquad (II)$$

wherein $R^4$, $R^5$ and $R^6$ are straight- or branched-chain hydrocarbon groups having 1 to 10 carbon atoms, which include or exclude an oxygen atom or a nitrogen atom, and are equal to or different from each other, k is a real number between 2 and 15, and a plurality of —$OSiR^4R^5R^6$ groups are equal to or different from each other.

In addition, the optical filter 2-2 of the present disclosure is characterized in that a resin layer containing hydrolyzed and dehydrated condensates of one or more coupling agents selected from compounds represented by Formulas (III) and (IV) below is provided on the absorbing glass substrate composed of phosphate-based glass or fluorophosphate-based glass:

$$M\{OSi(OR^7)(OR^8)(OR^9)\}_n \qquad (III)$$

wherein M is a Ti atom, a Zr atom, or an Al atom, $R^7$, $R^8$ and $R^9$ are straight- or branched-chain hydrocarbon groups having 1 to 10 carbon atoms and are equal to or different from each other, n is 4 when M is a Ti atom or a Zr atom, or 3 when M is an Al atom, and a plurality of —$OSi(OR^7)(OR^8)(OR^9)$ groups are equal to or different from each other, and

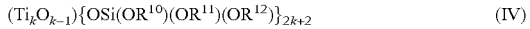
$$(Ti_kO_{k-1})\{OSi(OR^{10})(OR^{11})(OR^{12})\}_{2k+2} \qquad (IV)$$

wherein $R^{10}$, $R^{11}$ and $R^{12}$ are straight- or branched-chain hydrocarbon groups having 1 to 10 carbon atoms and are equal to or different from each other, k is a real number between 2 and 15, a plurality of —$OSi(OR^{10})(OR^{11})(OR^{12})$ groups are equal to or different from each other.

The optical filter 2 of the present disclosure differs from the optical filter 1 of the present disclosure in that a component (for example, a coupling agent or a hydrolyzed and dehydrated condensate of a coupling agent composition) of a bonding layer of the optical filter 2 is included in a resin layer described below, but other particulars thereof are the same as those of the optical filter 1. Accordingly, detailed descriptions of the same particulars are the same as those described above.

In addition, in the resin layer constituting the optical filter 2 of the present disclosure, a ratio, α (atomic %), of a total atomic number of a Ti atom, a Zr atom, and an Al atom to a total number of a Si atom, a Ti atom, a Zr atom, and an Al atom (total atom number) is preferably greater than 0 atomic % and 33.3 atomic % or less, more preferably 9 to 33.3 atomic %, even more preferably 12 to 33.3 atomic %.

In the present specification, a ratio, α (atomic %), of a total atomic number of a Ti atom, a Zr atom, and an Al atom constituting the resin layer refers to a value obtained under the same conditions as the conditions of the STEM-EDX measurement performed to obtain a ratio, α (atomic %), of a total atomic number of a Ti atom, a Zr atom, and an Al atom constituting the aforementioned bonding layer.

The optical filter 2 of the present disclosure may be manufactured, for example, by coating an absorbing glass substrate composed of phosphate-based glass or fluorophosphate-based glass with a resin layer formation solution (described below) containing a hydrolysate of the coupling agent composition to form a coating film. Next, dehydration condensation reaction may be allowed to proceed through appropriate heating. Particles of the coupling agent strongly bind to each other, or the hydrolyzed and dehydrated condensate of the coupling agent strongly binds with an absorbing glass substrate by the manufacturing method, thereby forming a desired optical filter.

[Resin Layer]

With regard to the optical filter according to the present disclosure, a resin layer may be, for example, an absorbing resin layer for absorbing ultraviolet light or near infrared light, an antireflection film, a reflection-amplifying film, a protective film for preventing glass from being blurred, a reinforcing film for improving the strength of glass, a water-repellent film, or the like.

The absorbing resin layer for absorbing ultraviolet light or near infrared light may include a near-infrared absorbing dye and a transparent resin. A near-infrared absorbing dye capable of being uniformly dissolved or dispersed in a transparent resin is preferred.

As the near-infrared absorbing dye constituting the absorbing resin layer, conventionally known ones may be used. The near-infrared absorbing dye is more preferably one or more selected from a cyanine-based dye, a polymethine-based dye, a squarylium-based dye, a porphyrin-based dye, a metal-dithiol complex-based dye, a phthalocyanine-based dye, a diammonium-based dye, and inorganic oxide particles, more preferably one or more selected from a squarylium-based dye, a cyanine-based dye, and a phthalocyanine-based dye.

A conventionally known transparent resin may be used as a resin for constituting the resin layer. For example, one or more selected from an acrylic resin, an epoxy resin, an enthiol resin, a polycarbonate resin, a polyether resin, a polyarylate resin, a polysulfone resin, a polyethersulfone resin, a polyparaphenylene resin, a poly(arylene ether phosphine oxide) resin, a polyimide resin, a polyamideimide resin, a polyolefin resin, a cyclic olefin resin and a polyester resin may be used.

Preferably, the transparent resin is transparent, and has a high glass transition point (Tg) in terms of solubility and heat resistance of a near-infrared absorbing dye thereto. Particularly, the transparent resin is preferably one or more selected from a polyester resin, a polycarbonate resin, a polyethersulfone resin, a polyarylate resin, a polyimide resin, and an epoxy resin, more preferably one or more selected from a polyester resin and a polyimide resin.

The polyester resin is preferably one or more selected from a polyethylene terephthalate resin and a polyethylene naphthalate resin.

The resin layer may contain any ingredients such as a color tone correcting dye, a leveling agent, an antistatic agent, a heat stabilizer, a light stabilizer, an antioxidant, a dispersant, a flame retardant, a lubricant, and a plasticizer, within a range not impairing the effects of the present disclosure, in addition to the near-infrared absorbing dye and the transparent resin.

In the case of the optical filter 1 of the present disclosure, for example, a film generated by hydrolyzing a solution containing the coupling agent composition is formed on an absorbing glass substrate composed of phosphate-based glass or fluorophosphate-based glass and a resin layer formation solution for absorbing at least one of ultraviolet light and near infrared light is coated on the film, thereby forming a coating film, as described above.

In the case of the optical filter 2 of the present disclosure, for example, an absorbing glass substrate composed of phosphate-based glass or fluorophosphate-based glass is coated with a resin layer formation solution containing the coupling agent composition, thereby forming a coating film.

For example, the resin layer may be formed by dissolving or dispersing a pigment; a transparent resin; a coupling agent, which is included only in the case of the IRCF according to the second embodiment of the present disclosure, and predetermined ingredients in a solvent to prepare a resin layer formation solution and coating with the resin layer formation solution, followed by drying and, as needed, hardening the same.

The resin layer formation solution may include a known cationic surfactant, anionic surfactant, or nonionic surfactant, or the like.

The resin layer formation solution may be coated using one or more coating methods selected from an immersion coating method, a cast coating method, a spray coating method, and a spin coating method.

After forming the resin layer formation solution on a substrate, a drying process may be performed to form a resin layer.

The optical filter according to the present disclosure may be an IRCF.

Figure 2A:
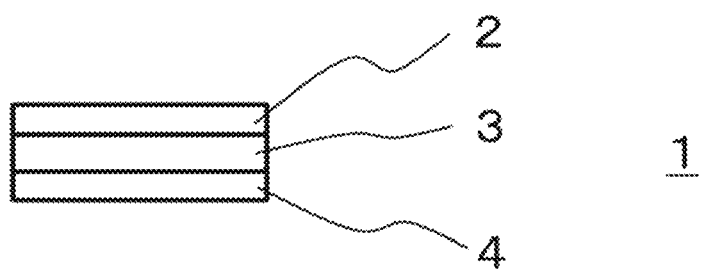
FIG. 2A and FIG. 2B illustrate schematic views of structures of IRCFs 1.
Figure 2B:
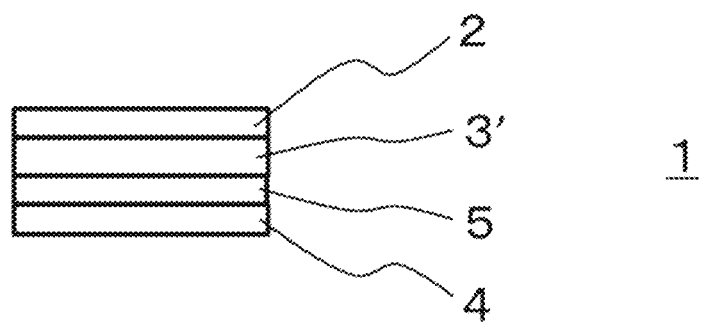

When the optical filter according to the present disclosure is an IRCF, the IRCF may be, for example, an IRCF 1 including an absorbing glass substrate 3' for absorbing ultraviolet light or near infrared light; and an absorbing resin layer 5 for absorbing ultraviolet light or near infrared light additionally provided on a lower surface side (light-emitting surface side) of the absorbing glass substrate 3', as shown in FIG. 2(b).

In the embodiment shown in FIG. 2(b), the reflective film (UVIR film) 2 is provided on an upper surface side (light-incident surface side) of the absorbing glass substrate 3' for absorbing ultraviolet light or near infrared light, and an antireflection film (AR film) 4 is additionally provided on a lower surface side of the absorbing resin layer 5 for absorbing ultraviolet light or near infrared light.

In the embodiment, a film capable of transmitting visible light and shielding light in the ultraviolet region and the near-infrared region may be used as the reflective film (UVIR film) 2, and the reflective film (UVIR film) 2 may be a dielectric multilayer film.

The dielectric multilayer film may be formed by alternately laminating a dielectric film (low refractive index film) having a low refractive index and a dielectric film (high refractive index film) having a high refractive index. The high refractive index film may be composed of one or more selected from $Ta_2O_5$, $TiO_2$, $Nb_2O_5$, and the like. The high refractive index film is preferably $TiO_2$.

In addition, the low refractive index film may be composed of one or more selected from $SiO_2$, $SiO_xN_y$, and the like. The low refractive index film is preferably $SiO_2$.

An antireflection film (AR film) may be used as a dielectric multilayer film.

According to the present disclosure, an IRCF including a resin layer having high adhesion to an absorbing glass substrate composed of phosphate-based glass or fluorophosphate glass may be provided.

Now, an imaging apparatus according to the present disclosure is described in detail.

The imaging apparatus according to the present disclosure includes a solid-state image device; an image lens; and the optical filter according to the present disclosure.

As the solid-state image device, an image sensor such as a charge-coupled device (CCD) sensor or a complementary metal oxide semiconductor (CMOS) may be used.

The camera module in shown FIG. 1 is an embodiment of a component constituting the imaging apparatus according to the present disclosure.

FIG. 1(a) illustrates a schematic view of a camera module of a compact digital camera mounted in a smartphone, etc. The camera module shown in FIG. 1(a) includes one lens L (or one or more lenses L1 . . . Ln); the optical filter 1 according to the present disclosure; and an image sensor IC.

Figure 1B:
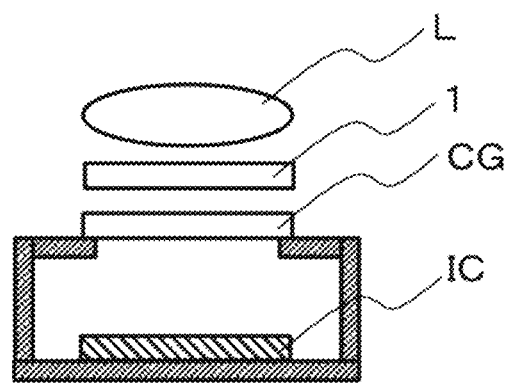

In addition, FIG. 1(b) illustrates a schematic view of a camera module of a digital SLR camera. The camera module shown in FIG. 1(b) includes a lens L; the optical filter 1 according to the present disclosure; a cover glass CG; and an image sensor IC.

According to the present disclosure, an imaging apparatus including an optical filter that is provided with a resin layer having high adhesion to an absorbing glass substrate composed of phosphate-based glass or fluorophosphate glass may be provided.

EXAMPLE

Hereinafter, the present disclosure will be described in detail with reference to the following Examples and Comparative Examples. However, the following Examples and Comparative Examples are not provided to limit the scope of the present disclosure.

Examples 1 to 7 and Comparative Example 1

1. Preparation of Coupling Agent-Containing Coating Solution (1) 0.3 mL of an aqueous 0.5 N (mol/L) HCl solution and 2.2 mL of 2-methoxyethanol were weighed in a container and mixed under a tightly closed condition.

(2) Tetraethyl orthosilicate ($Si(OC_2H_5)_4$) was added to the container and mixed for 30 minutes under a tightly closed condition so that reaction according to the following reaction scheme was allowed to proceed:

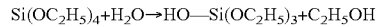

$$Si(OC_2H_5)_4 + H_2O \rightarrow HO\text{---}Si(OC_2H_5)_3 + C_2H_5OH$$

Water is completely consumed by the reaction, whereby a hydroxyl group is generated. Accordingly, it was anticipated that a uniform solution would be obtained without precipitation of hydroxide even when an alkoxide of Ti having a high hydrolysis rate was added.

(3) Titanium (IV) n-butoxide ($Ti(OC_4H_9)_4$) was added to the container in a proportion summarized in Table 1 and mixed for 30 minutes under a tightly closed condition 30, thereby preparing a coupling agent-containing coating solution. In Table 1, addition ratios of HO—Si(OC$_2$H$_5$)$_3$ to Ti(OC$_4$H$_9$)$_4$ are summarized based on 100 mol % of the sum of HO—Si(OC$_2$H$_5$)$_3$ and Ti(OC$_4$H$_9$)$_4$.

Here, it is considered that reaction according to the following reaction scheme occurred in the container:

$$4\text{OH—Si}(OC_2H_5)_3 + \text{Ti}(OC_4H_9)_4 \rightarrow \text{Ti}(O\text{—Si}(OC_2H_5)_3)_4 + 4C_4H_9OH$$

2. Formation of Coating Film 1.2 mL of an aqueous 0.5 N HCl solution, 4.7 mL of water, and 8.1 mL of 2-methoxyethanol were weighed in a container containing the coupling agent-containing coating solution and mixed for 30 minutes under a tightly closed condition, thereby preparing a coating film formation solution.

Here, it is considered that reaction according to the following reaction scheme occurred in the container:

$$\text{Ti}\{(O\text{—Si}(OC_2H_5)_3\}_4 + 12H_2O \rightarrow \text{Ti}\{(O\text{—Si}(OH)_3\}_4 + 12C_2H_5OH$$

$$\text{HO—Si}(OC_2H_5)_3 + 3H_2O \rightarrow \text{Si}(OH)_4 + 3C_2H_5OH$$

The obtained coating film formation solution was coated to a thickness of 0.03 mL/cm$^2$ on an absorbing glass substrate (CD700 manufactured by HOYA Corporation, thickness: 0.59 mm) composed of fluorophosphate-based glass using a spin coater.

The absorbing glass substrate coated with the coating film formation solution was placed on a hot plate heated to 250° C. and heated for 30 minutes to be dehydrated and condensed. As a result, a cured film (bonding layer) was formed on the absorbing glass substrate (hereinafter referred to as "evaluation substrate").

In each of the examples and the comparative examples, a plurality of evaluation substrates 1 was manufactured. (1) An untreated substrate, (2) a boiled substrate, (3) a substrate treated by a highly accelerated life tester (PCT treatment), and (4) a substrate subjected to high temperature and high humidity treatment were prepared as described below.

Now, the boiling treatment, the highly accelerated life test (PCT treatment), and the high temperature and high humidity treatment are described.

(Boiling Treatment)

An evaluation substrate was immersed in boiling water and maintained therein for 60 minutes. The evaluation substrate was taken out of the water and dried by blowing nitrogen.

(Highly Accelerated Life Test (PCT Treatment))

An evaluation substrate was placed in a highly accelerated life tester (manufactured by Espec Co., EHS-411M) and pressurized under a pressure of 0.13 MPa at 135° C. and a humidity of 85% for 72 hours. The pressurized evaluation substrate was taken out of the highly accelerated life tester.

(High Temperature and High Humidity Treatment)

An evaluation substrate was placed in a high temperature and high humidity tester (manufactured by Espec Co., PL-2KPH) and treated at 85° C. and a humidity of 85% for 1000 hours. The treated evaluation substrate was taken out of the high temperature and high humidity tester.

A cured film-containing surface of each of (1) the untreated evaluation substrate, (2) the boiled evaluation substrate, (3) the evaluation substrate treated by a highly accelerated life tester (PCT treatment), and (4) the evaluation substrate subjected to high temperature and high humidity treatment was subjected to an adhesion cross-cut test according to the regulations of JIS 5600-5-6.

Obtained test results were classified based on the following evaluation criteria 0 to 5. The results are summarized in Table 1.

0: An edge of a cut portion is completely smooth and no peeling is observed in any grid eyes.
1: A laminate at an intersection of cut portions is slightly peeled off. Less than 5% of an area per unit area is peeled off.
2: A film is peeled off along an edge of a cut portion and/or a film at an intersection of cut portions is peeled off. 5% or more and less than 15% of an area per unit area is peeled off.
3: A portion or the entirety of a film is greatly peeled off along an edge of a cut portion, and/or several parts of grid eyes are partially or entirely peeled off. 15% or more and less than 35% of an area per unit area is peeled off.
4: A portion or the entirety of a film is greatly peeled off along an edge of a cut portion, and/or several grid eyes are partially or entirely peeled off. Less than 35% of an area per unit area is peeled off.
5: 35% or more of an area per unit area is peeled off.

Example 8

A coupling agent-containing coating solution was prepared in the same manner as in Example 6, except that zirconium(IV)n-butoxide (Zr(OC$_4$H$_9$)$_4$) was used instead of titanium(IV)n-butoxide (Ti(OC$_4$H$_9$)$_4$). Next, an evaluation substrate 1 provided with a coating film was prepared and subjected to a cross-cut test as in Example 6. Results are summarized in Table 2.

Example 9

A coupling agent-containing coating solution was prepared in the same manner as in Example 3, except that aluminum-butoxide (Al(OC$_4$H$_9$)$_3$) was used instead of titanium(IV)n-butoxide (Ti(OC$_4$H$_9$)$_4$). Next, an evaluation substrate 1 provided with a coating film was prepared and subjected to a cross-cut test as in Example 3. Results are summarized in Table 3.

Examples 10 to 12

1. Preparation of Coupling Agent-Containing Coating Solution (1) 0.3 mL of an aqueous 0.5 N (mol/L) HCl solution and 2.2 mL of 2-methoxyethanol were weighed and mixed in a container under a tightly closed condition.
(2) Tetraethyl orthosilicate (Si(OC$_2$H$_5$)$_4$) was added to the container and mixed for 30 minutes under a tightly closed condition 30 so that reaction according to the following reaction scheme was allowed to proceed:

$$\text{Si}(OC_2H_5)_4 + H_2O \rightarrow \text{HO—Si}(OC_2H_5)_3 + C_2H_5OH$$

Water is completely consumed by the reaction, whereby a hydroxyl group is generated. Accordingly, it was anticipated that a uniform solution was obtained without precipitation of hydroxide even when an alkoxide of Ti having a high hydrolysis rate was added.

(3) A tetra-n-butoxy titanium polymer (Ti$_4$O$_3$(OC$_4$H$_9$)$_{10}$) was added to the container in a proportion summarized in Table 1 and mixed for 30 minutes under a tightly closed condition 30, thereby preparing a coupling agent-containing coating solution.

Here, it is considered that reaction according to the following reaction scheme occurred in the container:

10OH—Si(OC$_2$H$_5$)$_3$+Ti$_4$O$_3$(OC$_4$H$_9$)$_{10}$→Ti$_4$O$_3$(O—Si(OC$_2$H$_5$)$_3$)$_{10}$+10C$_4$H$_9$OH

A coating solution was prepared by the same method using each of Ti$_7$O$_6$(OC$_4$H$_9$)$_{16}$ (Example 11) and Ti$_{10}$O$_9$(OC$_4$H$_9$)$_{22}$ (Example 12) instead of Ti$_4$O$_3$(OC$_4$H$_9$)$_{10}$ (Example 10). In Table 4, a mixing ratio of a silicon compound to a titanium compound in each coating solution is summarized. In addition, the mixing ratios disclosed in Table 4 refer to ratios of each of HO—Si(OC$_2$H$_5$)$_3$ and a titanium compound when the sum of OH—Si(OC$_2$H$_5$)$_3$ and each titanium compound represented by formula Ti$_k$O$_{k-1}$(OC$_4$H$_9$)$_{2k+2}$ is 100 mol %.

2. Formation of Coating Film 1.2 mL of an aqueous 0.5 N HCl solution, 4.7 mL of water, and 8.1 mL of 2-methoxyethanol were additionally weighed in a container containing the coupling agent-containing coating solution and mixed for 30 minutes under a tightly closed condition, thereby preparing a coating film formation solution.

For example, when Ti$_4$O$_3$(OC$_4$H$_9$)$_{10}$ was used, it is considered that reaction according to the following reaction scheme occurred in the container:

Ti$_4$O$_3${O—Si(OC$_2$H$_5$)$_3$}$_{10}$+30H$_2$O→Ti$_4$O$_3${(O—Si(OH)$_3$}$_{10}$+30C$_2$H$_5$OH

HO—Si(OC$_2$H$_5$)$_3$+3H$_2$O→Si(OH)$_4$+3C$_2$H$_5$OH

The obtained coating film formation solution was coated to a thickness of 0.03 mL/cm$^2$ on an absorbing glass substrate (CD700 manufactured by HOYA Corporation, thickness: 0.59 mm) composed of fluorophosphate-based glass using a spin coater.

The absorbing glass substrate coated with the coating film formation solution was placed on a hot plate heated to 250° C. and heated for 30 minutes to be dehydrated and condensed. As a result, a cured film (bonding layer) was formed on the absorbing glass substrate (hereinafter referred to as "evaluation substrate 1").

3. Formation of Resin Layer

A resin layer was additionally formed on an absorbing glass substrate with a cured film (bonding layer) obtained by the process according to the following procedures:

(1) 0.2 g of a polyvinyl butyral resin and 1.8 g of cyclopentanone were weighed and mixed in a container under a tightly closed condition, (2) 0.09 g of toluene diisocyanate was added to the container, and mixed under a tightly closed condition, thereby preparing a resin layer formation solution, (3) the obtained resin layer formation solution was coated in an amount of 0.03 mL/cm$^2$ on the absorbing glass substrate, on a surface of which the cured film (bonding layer) was present, obtained by the process by means of a spin coater, and (4) the absorbing glass substrate coated with the resin layer formation solution was placed on a hot plate heated to 160° C. and heated for 20 minutes to be cured, thereby manufacturing a glass substrate (evaluation substrate 2) having a resin layer on a surface thereof.

With regard to the evaluation substrate 1, which only had the cured film (bonding layer), and the evaluation substrate 2, which had the bonding layer and, additionally, the resin layer formed on the bonding layer, of Examples 10 to 12, (1) untreated substrates and (2) boiled substrates as in Examples 1 to 9 were prepared.

With regard to (1) the untreated evaluation substrates and (2) the boiled evaluation substrate, a surface with the cured film (bonding layer) of the evaluation substrate 1 or a surface with the resin layer of the evaluation substrate 2 were subjected to an adhesion cross-cut test according to the regulations of JIS 5600-5-6. Obtained test results were based on the following evaluation criteria 0 to 5 as in Examples 1 to 9. Results are summarized in Table 4.

In addition, the evaluation substrate 2 obtained in Example 11 was subjected to STEM-EDX measurement to obtain STEM-EDX lines (EDX ray (K ray) detection intensity lines in a depth direction of each element constituting an optical filter), and a content ratio, α (atomic %), of a Ti atom to a total number of a Si atom and a Ti atom constituting a bonding layer thereof and a content ratio, β (atomic %), of a Si atom thereto were respectively calculated according to the following equations:

$$\alpha = \frac{(X_{Ti} \times K_{Ti} \div M_{Ti})}{(X_{Si} \times K_{Si} \div M_{Si}) + (X_{Ti} \times K_{Ti} \div M_{Ti})} \times 100 \quad \text{[Equation 5]}$$

$$\beta = \frac{(X_{Si} \times K_{Si} \div M_{Si})}{(X_{Si} \times K_{Si} \div M_{Si}) + (X_{Ti} \times K_{Ti} \div M_{Ti})} \times 100 \quad \text{[Equation 6]}$$

wherein $X_{Si}$ denotes the integral strength of EDX rays of a Si atom in a region constituting a bonding layer, $X_{Ti}$ denotes the integral strength of EDX rays of a Ti atom in a region constituting a bonding layer, $K_{Si}$ denotes the k factor (correction coefficient) of a Si atom, $K_{Ti}$ denotes the k factor (correction coefficient) of a Ti atom, and $M_{Si}$ denotes the atomic weight of a Si atom, and $M_{Ti}$ denotes the atomic weight of a Ti atom.

Results are summarized in Table 5 below.

TABLE 1

| | Mix ratio (mol %) | | Cross-cut test result of evaluation substrate 1 | | | |
| | | | (1) | (2) | (3) PCT treatment | (4) High temperature and high humidity treatment |
| | OH—Si(OC$_2$H$_5$)$_3$ | Ti(OC$_4$H$_9$)$_4$ | Untreated | Boiled | | |
| Comparative Example 1 | 100 | 0 | — | 5 | 5 | — |
| Example 1 | 97 | 3 | — | 1 | 5 | — |
| Example 2 | 94 | 6 | — | 1 | 5 | — |
| Example 3 | 91 | 9 | — | 0 | 1 | — |

TABLE 1-continued

| | Mix ratio (mol %) | | Cross-cut test result of evaluation substrate 1 | | | |
|---|---|---|---|---|---|---|
| | | | (1) | (2) | (3) PCT | (4) High temperature and high humidity |
| | OH—Si(OC$_2$H$_5$)$_3$ | Ti(OC$_4$H$_9$)$_4$ | Untreated | Boiled | treatment | treatment |
| Example 4 | 88 | 12 | 0 | 0 | 0 | — |
| Example 5 | 85 | 15 | 0 | 0 | 0 | — |
| Example 6 | 82 | 18 | — | 0 | 0 | 0 |
| Example 7 | 80 | 20 | 0 | 0 | — | — |

TABLE 2

| | Mix ratio (mol %) | | Cross-cut test result of evaluation substrate 1 | | | |
|---|---|---|---|---|---|---|
| | | | (1) | (2) | (3) PCT | (4) High temperature and high humidity |
| | OH—Si(OC$_2$H$_5$)$_3$ | Zr(OC$_4$H$_9$)$_4$ | Untreated | Boiled | treatment | treatment |
| Example 8 | 82 | 18 | — | 0 | — | — |

TABLE 3

| | Mix ratio (mol %) | | Cross-cut test result of evaluation substrate 1 | | | |
|---|---|---|---|---|---|---|
| | | | (1) | (2) | (3) PCT | (4) High temperature and high humidity |
| | OH—Si(OC$_2$H$_5$)$_3$ | Al(OC$_4$H$_9$)$_3$ | Untreated | Boiled | treatment | treatment |
| Example 9 | 91 | 9 | — | 0 | — | — |

TABLE 4

| | Mix ratio (mol %) | | | Cross-cut test result | | | |
|---|---|---|---|---|---|---|---|
| | | | | Evaluation substrate 1 (bonding layer) | | Evaluation substrate 2 (resin layer) | |
| | | | | (1) | (2) | (1) | (2) |
| | OH—Si(OC$_2$H$_5$)$_3$ | Ti$_k$O$_{k-1}$(OC$_4$H$_9$)$_{2k+2}$ | k | Untreated | Boiled | Untreated | Boiled |
| Example 10 | 91 | 9 | 4 | — | 0 | 0 | 1 |
| Example 11 | 94 | 6 | 7 | 0 | 0 | 0 | 1 |
| Example 12 | 96 | 4 | 10 | 0 | 0 | 0 | 1 |

| | Mix ratio (mol %) | | | Content ratio (atomic %) | |
|---|---|---|---|---|---|
| | | | | Ti atom content | Si atom content |
| | OH—Si(OC$_2$H$_5$)$_3$ | Ti$_k$O$_{k-1}$(OC$_4$H$_9$)$_{2k+2}$ | k | ratio α | ratio β |
| Example 11 | 94 | 6 | 7 | 22 | 78 |

From Tables 1 to 3, it can be confirmed that, in the case of Examples 1 to 9, the cured film (bonding layer) including a hydrolyzed and dehydrated condensate of a specific coupling agent represented by formula M{OSi(OR$^7$)(OR$^8$)(OR$^9$)}$_n$ is formed on the absorbing glass substrate, thereby having high adhesion to the absorbing glass substrate.

In addition, it can be confirmed from Tables 4 to 5 that, in the case of Examples 10 to 12, the cured film (bonding layer) or resin layer formed on the absorbing glass substrate is a cured film (bonding layer) including a hydrolyzed and dehydrated condensate of a specific coupling agent represented by formula (Ti$_k$O$_{k-1}$){OSi(OR$^{10}$)(OR$^{11}$)(OR$^{12}$)}$_{2k+2}$ or a resin layer formed on a cured film (bonding layer) related thereto, thereby having high adhesion to the absorbing glass substrate. In particular, it can be confirmed that, in the case of Examples 10 to 12, excellent adhesion is exhibited, compared to Examples 1 to 3, in which a mix ratio (mol %) of the titanium compound is the same, although a mix ratio (mol %) of the titanium compound constituting the cured film is low. These results indicate that excellent adhesion is exhibited due to a lower content ratio when a polymer, instead of a monomer, is used as a titanium compound.

Meanwhile, it can be confirmed from Table 1 that, since the cured film formed on the absorbing glass substrate of Comparative Example 1 excludes the hydrolyzed and dehydrated condensate of the specific coupling agent, adhesion of the cured film to an absorbing glass substrate is deteriorated particularly in the copresence of moisture.

As apparent from the above description, the present disclosure provides an optical filter comprising an absorbing glass substrate composed of phosphate-based glass or fluorophosphate glass having a resin layer provided thereon with high adhesion, and an imaging apparatus including the optical filter.

INDUSTRIAL APPLICABILITY

In accordance with the present disclosure, an IRCF provided with a resin layer that has high adhesion to an absorbing glass substrate composed of phosphate-based glass or fluorophosphate glass; and an imaging apparatus including the IRCF can be provided.

DESCRIPTION OF SYMBOLS

1 ... OPTICAL FILTER (IRCF)
2 ... REFLECTING FILM (UVIR FILM)
3 ... GLASS SUBSTRATE
3' ... ABSORBING GLASS SUBSTRATE
4 ... ANTIREFLECTION FILM (AR FILM)
5 ... ABSORBING RESIN LAYER
L ... LENS
CG ... COVER GLASS
IC ... IMAGE SENSOR

What is claimed is:

1. An optical filter, comprising:
an absorbing glass substrate for absorbing ultraviolet light or near infrared light that is composed of a phosphate-based glass or a fluorophosphate-based glass;
a bonding layer that is provided on the absorbing glass substrate, that has a single layer structure, and that comprises a dehydrated condensate of at least one coupling agent, said coupling agent comprising a silicon compound containing a Si atom and a metal alkoxide containing one or more selected from a Zr atom and an Al atom; and
a resin layer disposed on the bonding layer; and
wherein the bonding layer is 0.01 μm to 0.5 μm in thickness.

2. The optical filter according to claim 1, wherein the at least one coupling agent has a ratio of a total atomic number of the Zr atom and the Al atom to a total atomic number of the Si atom, the Zr atom, and the Al atom that ranges from greater than 0 up to 33.3.

3. The optical filter according to claim 1, wherein the at least one coupling agent is selected from compounds represented by Formula (I) below:

$$M(OSiR^1R^2R^3)_n \quad (I),$$

where M is a Zr atom or an Al atom, R$^1$, R$^2$ and R$^3$ are straight- or branched-chain hydrocarbon groups having 1 to 10 carbon atoms, which comprise or exclude an oxygen atom or a nitrogen atom, and are equal to or different from each other, n is 4 when M is a Zr atom, or 3 when M is an Al atom, and a plurality of —OSiR$^1$R$^2$R$^3$ groups are equal to or different from each other.

4. The optical filter according to claim 1, wherein the at least one coupling agent is selected from compounds represented by Formula (III) below:

$$M\{OSi(OR^7)(OR^8)(OR^9)\}_n \quad (III),$$

where M is a Zr atom or an Al atom, R$^7$, R$^8$ and R$^9$ are straight- or branched-chain hydrocarbon groups having 1 to 10 carbon atoms and are equal to or different from each other, n is 4 when M is a Zr atom, or 3 when M is an Al atom, and a plurality of —OSi(OR$^7$)(OR$^8$)(OR$^9$) groups are equal to or different from each other.

5. The optical filter according to claim 4, wherein the at least one coupling agent represented by Formula (III) is a reaction product between a silicon compound represented by Formula (V) below and a metal alkoxide selected from metal alkoxides represented by Formula (VII) and Formula (VIII) below:

$$Si(OR^7)(OR^8)(OR^9)OH \quad (V),$$

where R$^7$, R$^8$ and R$^9$ are straight- or branched-chain hydrocarbon groups having 1 to 10 carbon atoms and are equal to or different from each other, $$Zr(OR^{17})(OR^{18})(OR^{19})(OR^{20}) \quad (VII),$$

where R$^{17}$, R$^{18}$, R$^{19}$ and R$^{20}$ are straight- or branched-chain hydrocarbon groups having 1 to 10 carbon atoms and are equal to or different from each other, and $$Al(OR^{21})(OR^{22})(OR^{23}) \quad (VIII),$$

where R$^{21}$, R$^{22}$ and R$^{23}$ are straight- or branched-chain hydrocarbon groups having 1 to 10 carbon atoms and are equal to or different from each other.

6. The optical filter according to claim 1, wherein the dehydrated condensate of at least one coupling agent further includes a dehydrated condensate of silanol.

7. The optical filter according to claim 1, wherein the at least one coupling agent is a reaction product obtained by reacting between 50 mol % or more and less than 100 mol % of the silicon compound represented by Formula (V) below and greater than 0 mol % and 50 mol % or less of a metal alkoxide selected from metal alkoxides represented by Formula (VII) and Formula (VIII) below:

$$Si(OR^7)(OR^8)(OR^9)OH \quad (V),$$

where $R^7$, $R^8$ and $R^9$ are straight- or branched-chain hydrocarbon groups having 1 to 10 carbon atoms and are equal to or different from each other, $$Zr(OR^{17})(OR^{18})(OR^{19})(OR^{20}) \qquad (VII)$$

wherein $R^{17}$, $R^{18}$, $R^{19}$ and $R^{20}$ are straight- or branched-chain hydrocarbon groups having 1 to 10 carbon atoms and are equal to or different from each other, and $$Al(OR^{21})(OR^{22})(OR^{23}) \qquad (VIII)$$

wherein $R^{21}$, $R^{22}$ and $R^{23}$ are straight- or branched-chain hydrocarbon groups having 1 to 10 carbon atoms and are equal to or different from each other.

8. The optical filter according to claim 7, wherein the at least one coupling agent is a reaction product obtained by reacting between greater than 80 mol % and less than 100 mol % of the silicon compound represented by Formula (V) and greater than 0 mol % and less than 20 mol % of the metal alkoxide selected from metal alkoxides represented by Formula (VII) and Formula (VIII).

9. The optical filter according to claim 7, wherein the at least one coupling agent is a reaction product obtained by reacting between 85 to 94 mol % of the silicon compound represented by Formula (V) and 6 to 15 mol % of the metal alkoxide selected from metal alkoxides represented by Formula (VII) and Formula (VIII).

10. An optical filter, comprising:
an absorbing glass substrate for absorbing ultraviolet light or near infrared light that is composed of a phosphate-based glass or a fluorophosphate-based glass;
a bonding layer that is provided on the absorbing glass substrate, that has a single layer structure, and that comprises a dehydrated condensate of at least one coupling agent, said coupling agent comprising a silicon compound containing a Si atom and a metal alkoxide containing one or more selected from a Zr atom and an Al atom; and
a resin layer disposed on the bonding layer,
wherein the at least one coupling agent comprises
from 85 to 94 mol % of a silicon compound represented by Formula (V) below; and
from 6 to 15 mol % of a metal alkoxide selected from a metal alkoxide represented by Formula (VII) and Formula (VIII) below:

$$Si(OR^7)(OR^8)(OR^9)OH \qquad (V),$$

where $R^7$, $R^8$ and $R^9$ are straight- or branched-chain hydrocarbon groups having 1 to 10 carbon atoms and are equal to or different from each other, $$Zr(OR^{17})(OR^{18})(OR^{19})(OR^{20}) \qquad (VII),$$

where $R^{17}$, $R^{18}$, $R^{19}$ and $R^{20}$ are straight- or branched-chain hydrocarbon groups having 1 to 10 carbon atoms and are equal to or different from each other, and $$Al(OR^{21})(OR^{22})(OR^{23}) \qquad (VIII),$$

where $R^{21}$, $R^{22}$ and $R^{23}$ are straight- or branched-chain hydrocarbon groups having 1 to 10 carbon atoms and are equal to or different from each other; and
wherein the bonding layer is 0.01 μm to 0.5 μm in thickness.

11. The optical filter according to claim 4, wherein
M is a Zr atom, and
the bonding layer is provided directly on a surface of the absorbing glass substrate, and the resin layer is disposed directly on a surface of the bonding layer such that the resin layer is provided on the absorbing glass substrate through only the bonding layer, which is interposed between the resin layer and the absorbing glass substrate.

12. The optical filter according to claim 4, wherein
M is an Al atom, and
the bonding layer is provided directly on a surface of the absorbing glass substrate, and the resin layer is disposed directly on a surface of the bonding layer such that the resin layer is provided on the absorbing glass substrate through only the bonding layer, which is interposed between the resin layer and the absorbing glass substrate.

* * * * *